(12) United States Patent
Tin

(10) Patent No.: US 8,542,402 B2
(45) Date of Patent: Sep. 24, 2013

(54) SELECTION OF SAMPLES FOR SPANNING A SPECTRAL GAMUT

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 949 days.

(21) Appl. No.: 12/642,452

(22) Filed: Dec. 18, 2009

(65) Prior Publication Data

US 2011/0149307 A1    Jun. 23, 2011

(51) Int. Cl.
| | |
|---|---|
| G06F 15/00 | (2006.01) |
| G06F 3/08 | (2006.01) |
| G06K 1/00 | (2006.01) |
| G06K 9/00 | (2006.01) |

(52) U.S. Cl.
USPC ............ 358/1.9; 358/518; 382/162; 382/166; 382/167

(58) Field of Classification Search
USPC .................. 358/1.9, 509, 518–523; 382/162, 382/166, 167
See application file for complete search history.

(56) References Cited

U.S. PATENT DOCUMENTS

| | | | |
|---|---|---|---|
| 5,583,666 A | 12/1996 | Ellson et al. | |
| 5,892,891 A | 4/1999 | Dalal et al. | |
| 6,342,951 B1 | 1/2002 | Eschbach et al. | |
| 6,698,860 B2 | 3/2004 | Berns et al. | |
| 6,719,392 B2 | 4/2004 | Qiao | |
| 6,744,534 B1 | 6/2004 | Balasubramanian et al. | |
| 7,075,643 B2* | 7/2006 | Holub | 356/326 |
| 7,177,047 B2 | 2/2007 | Rozzi | |
| 7,342,593 B2 | 3/2008 | Agar | |
| 7,382,379 B1 | 6/2008 | Edge et al. | |
| 7,729,008 B2* | 6/2010 | Holub | 358/1.9 |
| 7,952,757 B2* | 5/2011 | Kaneko et al. | 358/1.9 |
| 8,031,938 B2* | 10/2011 | Edge | 382/167 |
| 2005/0094871 A1 | 5/2005 | Berns et al. | |
| 2005/0111017 A1 | 5/2005 | Takahashi et al. | |
| 2005/0163370 A1 | 7/2005 | Minakuti et al. | |
| 2006/0110031 A1 | 5/2006 | Bala et al. | |
| 2006/0285742 A1 | 12/2006 | Arai et al. | |

(Continued)

FOREIGN PATENT DOCUMENTS

WO    2005-043884    5/2005

OTHER PUBLICATIONS

F. Nakaya, et al., "Spectral encoding/decoding using LabRGB", Society for Imaging Science and Technology, 2007, pp. 190-194.

(Continued)

*Primary Examiner* — Twyler Haskins
*Assistant Examiner* — Jonathan Beckley
(74) *Attorney, Agent, or Firm* — Fitzpatrick, Cella, Harper & Scinto

(57) ABSTRACT

Determining a spectral gamut of a device by designating a spanning set of samples which span the spectral gamut. A first crude spanning set of samples is established by specifying one or more corresponding device values in a device color space. The first crude spanning set is refined by processing a plurality of new samples in a predetermined order. The processing includes, for each new sample, determining if the new sample differs in an objective function value by more than a predetermined threshold from all samples in the first crude spanning set and adding the new sample to the first crude spanning set if the new sample differs in the objective function value by more than the predetermined threshold. The resulting first crude spanning set is designated as the spanning set of samples.

21 Claims, 32 Drawing Sheets

(56) References Cited

U.S. PATENT DOCUMENTS

| | | |
|---|---|---|
| 2007/0121132 A1 | 5/2007 | Blinn et al. |
| 2007/0291312 A1 | 12/2007 | Kaneko et al. |
| 2008/0117444 A1 | 5/2008 | Stokes |
| 2008/0137941 A1 | 6/2008 | Tin |
| 2008/0239417 A1 | 10/2008 | Tsutsumi |
| 2008/0246982 A1 | 10/2008 | Kaneko et al. |
| 2009/0141321 A1 | 6/2009 | Tin |
| 2009/0141322 A1 | 6/2009 | Tin |
| 2009/0141970 A1 | 6/2009 | Tin |
| 2009/0148040 A1 | 6/2009 | Tin |
| 2009/0185200 A1 | 7/2009 | Tin |
| 2010/0020109 A1* | 1/2010 | Belik et al. .............. 345/690 |
| 2010/0172574 A1* | 7/2010 | Finlayson et al. .......... 382/162 |
| 2011/0026053 A1* | 2/2011 | Gil et al. ................ 358/1.9 |

OTHER PUBLICATIONS

M. Derhak, et al., "Spectral Colorimetry Using LabPQR-An Interim Connection Space", IS&T/SID Twelfth Color Imaging Conference, 2006, pp. 246-250.

B. Bastani, et al, "Spectral Gamut Mapping and Gamut Concavity", Society for Imaging Science and Technology, 2007, pp. 218-221.

S. Tsutsumi, et al., "Spectral Reproduction using LabPQR: Inverting the Fractional-Area-Coverage-to-Spectra Relationship", Proc. International Congress of Imaging Science, 2006.

S. Tsutusumi, et al., "Spectral Color Reproduction Using an Interim Connection Space-Based Lookup Table", Journal of Imaging Science and Technology 52(4), 2008, pp. 040201-1 to 040201-13.

R. Kimmel, et al., "Space-Dependent Color Gamut Mapping: a Variational Approach", IEEE Transactions on Image Processing, vol. 14, No. 6, 2005, pp. 796-803.

Y. Chen, et al., "Extending Printing Color Gamut by Optimizing the Spectral Reflectance of Inks", IS&T/SIC 12th Color Imaging Conference, 2004, pp. 163-169.

Y. Chen, et al., "Multi-Ink Color-Separation Algorithm Improving Image Quality", Journal of Imaging Science and Technology 52(2), 2008, pp. 020604-1 to 020604-9.

U.S. Appl. No. 12/260,916, filed Oct. 29, 2008, Applicant: Siu-Kei Tin.

U.S. Appl. No. 12/435,397, filed May 4, 2009, Applicant: Siu-Kei Tin.

U.S. Appl. No. 12/435,402, filed May 4, 2009, Applicant: Siu-Kei Tin.

U.S. Appl. No. 12/538,829, filed Aug. 10, 2009, Applicant: Siu-Kei Tin.

U.S. Appl. No. 12/625,552, filed Nov. 24, 2009, Applicant: Siu-Kei Tin.

* cited by examiner

◇   0 - dimensional stratum ($n_0 = 1$)
○   1 - dimensional strata   ($n_1 = 20$)
□   2 - dimensional stratum ($n_2 = 4$)

|  | LAB(D50) | LAB(D65) | LAB(A) | LAB(F2) | LAB(F7) | LAB(F11) | OBJ2 |
|---|---|---|---|---|---|---|---|
| SAMPLE 1 | | | | | | | |
| SAMPLE 2 | | | | | | | |
| SAMPLE 3 | | | | | | | |
| ⋮ | | | | | | | |

FIG. 14

SELECTION OF SAMPLES FOR SPANNING A SPECTRAL GAMUT

FIELD

The present disclosure relates to the field of color management, and more particularly relates to spectral gamut representation used in spectral gamut mapping.

BACKGROUND

Color management controls the color conversion of a color image from a source device to a destination device, such as from an image scanner or digital camera to a color printer or monitor. In color management, there is often a mismatch between the gamut of colors available to the source device and the gamut of colors available to the destination device. The adjustment for this gamut mismatch is referred to as gamut mapping.

Conventional gamut mapping is typically performed in a colorimetric color space which is three dimensional. Examples of colorimetric color spaces in which conventional gamut mapping may be performed include CIEXYZ color space or CIELAB color space. The appearance of a reproduction resulting from such colorimetric color management is dependent on viewing conditions. In particular, the appearance of the reproduction may not match the original when the reproduction is viewed under a light source different from that assumed during conventional gamut mapping.

More recently, spectral color management has been considered. Spectral color management is advantageous over colorimetric color management, in that spectral color management uses spectral reflectance data that includes far more information than colorimetric data to represent the original color. In comparison to three-dimensional colorimetric data, spectral reflectance data will often use 31 dimensions or more to represent the spectral reflectance of a color stimulus. For spectral reflectance data using 31 dimensions, each of the 31 dimensions corresponds to a reflectance for a wavelength at 10 nm intervals in the visible wavelength spectrum of 400 nm to 700 nm. Accordingly, the use of spectral reflectance data in spectral color management usually results in a color reproduction with a better color match under arbitrary illuminants than a reproduction resulting from colorimetric color management.

SUMMARY

Although spectral color management ordinarily produces a better color reproduction than colorimetric color management, the computational complexity of spectral color management is often too demanding to make spectral gamut mapping practical for currently available computing hardware, such as programmed general purpose computers. In particular, conventional gamut mapping algorithms are typically associated with operations (e.g., convex hulling) having a complexity that depends exponentially on the dimension of the data used to represent the colors. In practice, performing these algorithms using the relatively high dimension of spectral reflectance data can result in increased memory requirements and lengthy computational times when compared to performing such algorithms when using three-dimensional colorimetric data.

In keeping with the above concerns, the present inventor has developed a new method of spectral gamut mapping which involves use of a constrained subdivision of a device's spectral gamut to reduce the computational complexity typically associated with spectral color management. The subdivisions of the spectral gamut are constrained in the sense that the subdivisions are defined using a colorimetric space under a reference illuminant so that each subdivision is constrained by the colorimetry under the reference illuminant. Samples in the subdivisions correspond to device values designated so as to span the spectral gamut of the device. A color value in a color space is spectrally gamut-mapped by first identifying subdivisions within a tolerance of the color value's corresponding value in a colorimetric space that includes a lightness dimension, a chroma dimension and a hue dimension. The samples within the identified subdivisions are then searched for a sample that matches acceptably to the color value relative to an objective function.

Gamut mapping by constrained subdivision is described in greater detail in co-pending application Ser. No. 12/625,552, "Spectral Gamut Mapping by Constrained Subdivision of Gamut", filed on Nov. 24, 2009 by Siu-Kei Tin, the entire content of which is incorporated by reference herein.

The use of constrained subdivisions described above ordinarily reduces the computational complexity typically associated with spectral color management. More specifically, the identification of subdivisions allows for control of the number of samples searched so that computational complexity is ordinarily reduced. Put another way, samples in subdivisions beyond the tolerance are poor matches at the reference illuminant, and therefore cannot yield good spectral matches. Thus, the identification of subdivisions within the tolerance provides samples that are good candidates for a spectral match, for the reason that they are already good matches at the reference illuminant. Only this relatively few number of candidates need to be searched using the objective function in order to find a sample that provides a good spectral match to the accepted color.

Despite the advantages of gamut mapping through use of constrained subdivisions, the effectiveness of such gamut mapping depends on the quality of the samples used in the construction of the constrained subdivision. In particular, the inventor has discovered that in some situations, there are regions in the spectral gamut where the samples are not distributed densely enough, such that the closest spectral match obtained by searching the samples provides only a coarse match. In the aforementioned application, this situation was addressed through a dynamic re-sampling process, wherein if the best match is not satisfactory, new samples that are not already contained in the constrained subdivisions are generated dynamically. The new samples are generated in the vicinity of the closest match, in an effort to find an even better match. However, generating new samples dynamically may increase the time perceived by an end-user of the device for performing spectral color management.

Herein, the inventor proposes an approach that reduces the need for generating samples dynamically, by initially selecting samples in the constrained subdivisions such that they are sufficiently dense in all regions of the spectral gamut so that the closest match will almost always be a satisfactory match.

One rudimentary approach to ensure a sufficiently dense selection of samples is to include samples that correspond to every possible device value. However, such an approach is generally not practicable due to the large number of possible device values available to most devices. For example, specifying every possible device value for a six ink color printer with ink channels coded in eight bits results in over 281 trillion device values (i.e., 256 raised to the sixth power). A device with more than six ink channels has an even larger number of possible device values. In general, the number of device values depends exponentially on the number of channels.

Thus, according to an example embodiment described herein, a spanning set of samples for spanning the spectral gamut is designated by using a sieve-like process. A new sample is added to the current set only if its color differs by more than a just-noticeable color difference from all other samples already in the set under at least one illuminant from a predetermined set of illuminants.

As used herein, a just-noticeable color difference can be, for example, a threshold of 1 $\Delta E_{ab}$ unit in a CIELAB space.

By virtue of the foregoing, the spanning set of samples is considered nearly optimal because the above-described method can ordinarily provide a sufficiently dense sampling of the spectral gamut, without designating samples with colors that are indiscernible from colors of the samples already in the set. As a result, a sufficient set of samples for spanning the spectral gamut can ordinarily be designated for a multi-ink color printer with only millions of samples, as opposed to trillions of samples.

In one aspect, a first crude spanning set of samples is established by specifying one or more corresponding device values in a device color space. The first crude spanning set is refined by processing a plurality of new samples in a predetermined order. The processing includes, for each new sample, determining if the new sample does or does not differ in an objective function value by more than a predetermined threshold from all samples in the first crude spanning set. The first crude spanning set is modified by adding the new sample to the first crude spanning set if the new sample differs in the objective function value by more than the predetermined threshold from all samples in the first crude spanning set. After all the new samples are processed, the resulting first crude spanning set is designated as the spanning set of samples.

In use for determining a spectral gamut for the device, a spectral reflectance array for each sample in the spanning set is obtained. A colorimetric value for each sample in the spanning set is generated by transforming the spectral reflectance array corresponding to the sample under a reference illuminant. Each colorimetric value includes a lightness in a lightness dimension, a chroma in a chroma dimension and a hue in a hue dimension. The spanning set of samples is subdivided into subdivisions based on the lightness, the chroma and the hue of the samples such that the number of samples in each subdivision is limited by a predetermined number.

In use for spectrally gamut mapping a color value in a color space using the determined spectral gamut, the color value is accepted and converted into a colorimetric value under the reference illuminant. The converted colorimetric value includes a lightness in the lightness dimension, a chroma in the chroma dimension and a hue in the hue dimension. Subdivisions of the spanning set of samples are identified which fall within a tolerance of the converted colorimetric value by using the lightness, the chroma and the hue of the converted colorimetric value. The samples within the identified subdivisions are searched so as to find a sample that matches acceptably to the accepted color value relative to an objective function, which may or may not be the same objective function used in the designation of the spanning set of samples. The device value corresponding to this sample is then provided to the device.

Thus, in use for gamut-mapping, because the samples in the spanning set are adequately dense within a just-noticeable difference, the best match is almost always a completely satisfactory match. Accordingly, the need to dynamically generate new samples during gamut mapping is ordinarily avoided, for the reason that the best match is already within a visual threshold for discernible color difference from all the other samples in the spanning set. In other words, dynamically generating new samples will not provide any new colors that noticeably differ from the colors of the samples already in the spanning set.

In one aspect, designating the spanning set, obtaining a spectral reflectance array for each sample, generating a colorimetric value for each sample, and subdividing the spanning set can be performed during an off-line phase. The accepting, converting, identifying and searching can be performed during an on-line phase. This aspect allows for the designation of the spanning set and the determination of the spectral gamut during an off-line phase, thereby shortening the time for spectral color management that is perceived by an end-user of the device during an on-line phase.

In another aspect, the objective function value between a new sample and a sample in the first crude spanning set can be equal to a maximum value among multiple values resulting from a color difference equation evaluated under multiple illuminants for a spectral reflectance array of the new sample and a spectral reflectance array of the sample in the first crude spanning set.

According to another aspect, the predetermined threshold can have different values for different new samples which are located in different regions of the spectral gamut for the device. This ordinarily allows for adding more samples to the spanning set for regions that are deemed more critical, such as flesh-tone colors.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 14 is a diagram illustrating the layout of the auxiliary computational data structure according to an example embodiment.

DETAILED DESCRIPTION

Figure 1:
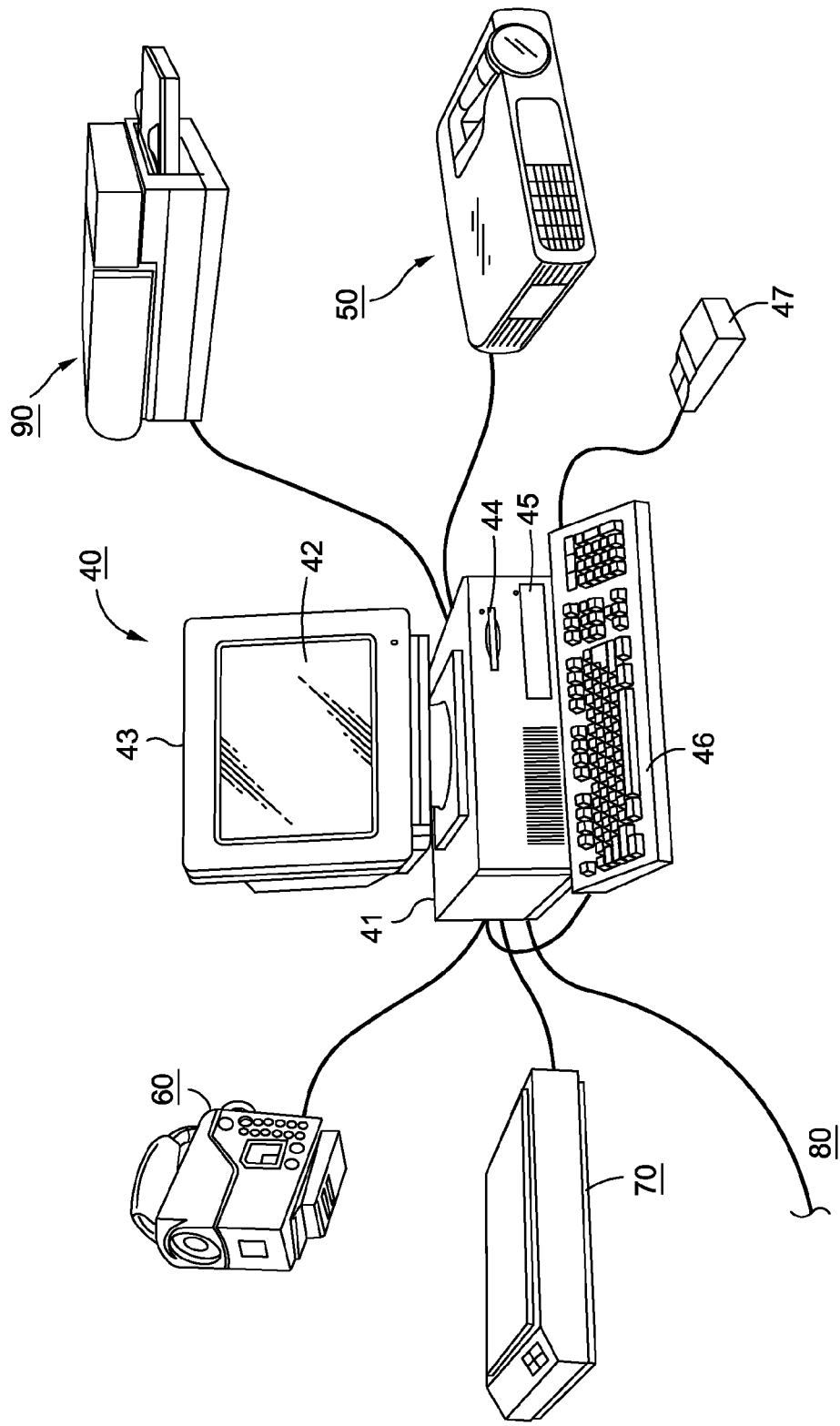
FIG. 1 is a representative view of computing equipment relevant to an example embodiment.

FIG. 1 is a representative view of computing equipment, peripherals and digital devices, relevant to an example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disc drive 44, which are constructed to store computer-readable information such as computer-executable process steps. DVD disc drive 44 provides a means whereby host computer 41 can access information, such as image data, computer-executable process steps, application programs, etc. stored on removable memory media. In addition, information can also be retrieved through other computer-readable media such as a USB storage device connected to a USB port (not shown), or through network 80. Other devices for accessing information stored on removable or remote media may also be provided.

Multi-ink printer 90, such as a CMYKRG printer, is a first example of a color output device capable of spectral color reproduction. In this example, printer 90 is provided for forming color images in accordance with image data from host computer 41 onto a medium such as paper.

Multispectral camera 60 is a first example of a color input device capable of spectral capture, and is provided for sending spectral image data to host computer 41. Multispectral scanner 70 is a second example of a color input device capable of spectral capture, and is provided for scanning documents and images and sending the corresponding spectral image data to host computer 41.

Of course, host computer 41 may acquire spectral image data from other sources such as a digital video camera, a local area network or the Internet via network 80. Likewise, host computer 41 may interface with other color output devices, such as color output devices accessible over network 80.

Figure 2:
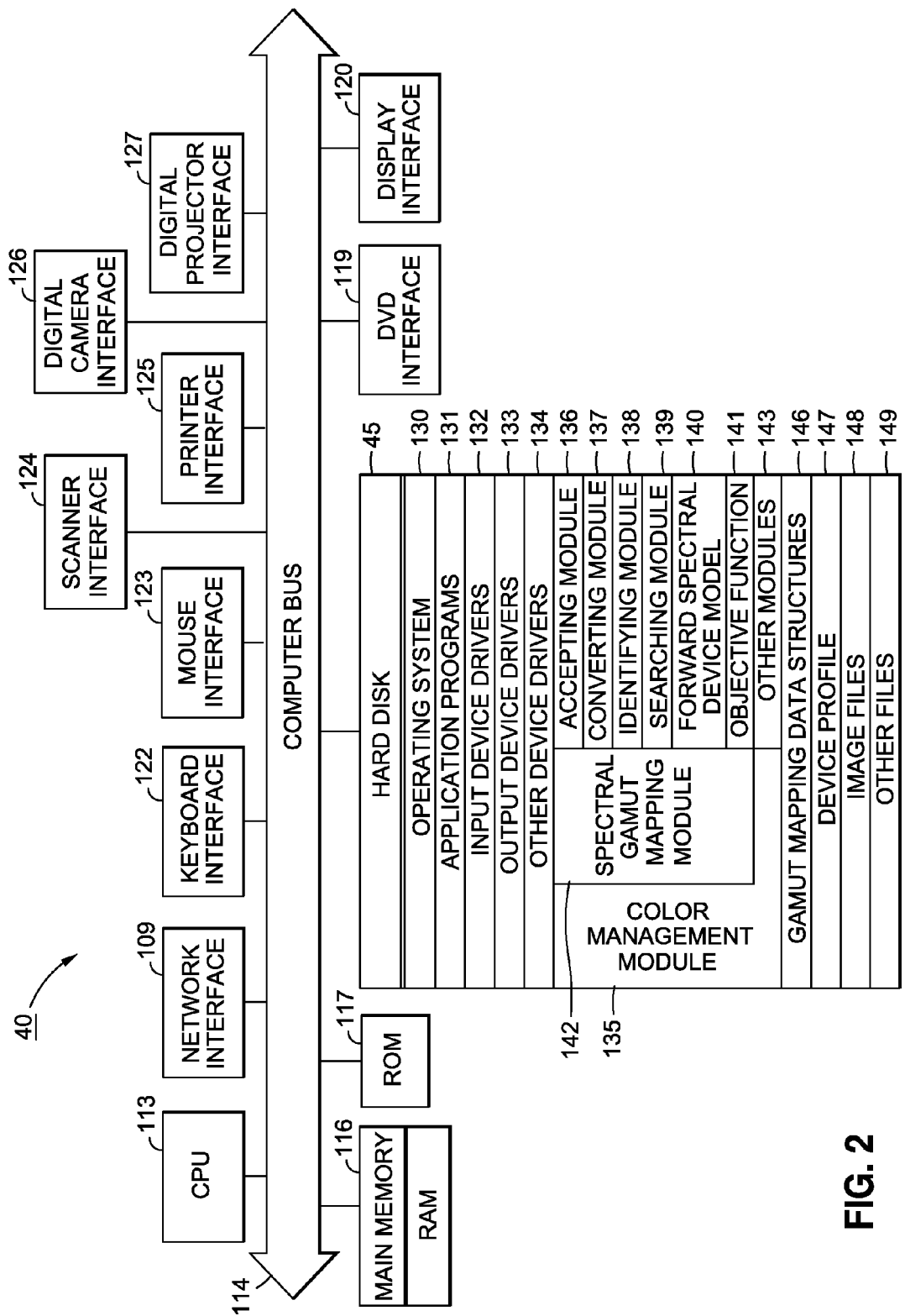
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which interfaces with computer bus 114. Also interfacing with computer bus 114 are hard disk 45, network interface 109, random access memory (RAM) 116 for use as a main run-time transient memory, read only memory (ROM) 117, DVD disc interface 119 for DVD disc drive 44, display interface 120 for monitor 43, keyboard interface 122 for keyboard 46, mouse interface 123 for pointing device 47, scanner interface 124 for scanner 70, printer interface 125 for printer 90, digital camera interface 126 for multispectral camera 60, and digital projector interface 127 for digital projector 50.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from hard disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, hard disk 45 contains operating system 130, application programs 131, such as word processing programs or graphic image management programs. Hard disk 45 also contains device drivers for software interface to devices, such as input device drivers 132, output device drivers 133, and other device drivers 134. Image files 148, including color image files, and other files 149 are available for output to color output devices and for manipulation by application programs.

Color management module (CMM) 135 includes spectral gamut mapping module 142 and other modules 143 for managing colors that are transferred from a source device to a destination device, such as the transfer of color image data from an image capture by multispectral camera 60 to a printout by multi-ink printer 90. CMM 135 may be configured as a part of operating system 130, as part of a device driver (e.g., printer driver, digital camera driver), or as a stand-alone application program. It may also be configured as a plug-in or dynamic link library (DLL) to the operating system, device driver or application program. For example, CMM 135 according to example embodiments, may be incorporated in an input/output device driver for execution in a computing device, embedded in the firmware of an input/output device, or provided in a stand-alone color management application for use on a general purpose computer. In one example embodiment described herein, CMM 135 is incorporated directly into the operating system for general purpose host computer 41. It can be appreciated that the present disclosure is not limited to these embodiments and that the disclosed color management module may be used in other environments in which color management is used.

As shown in FIG. 2, for the purpose of spectral color management, CMM 135 includes spectral gamut mapping module 142. Spectral gamut mapping module 142 includes accepting module 136, converting module 137, identifying module 138, searching module 139, forward spectral device model 140 and objective function 141. In this embodiment, each module of spectral gamut mapping module 142 comprises computer-executable process steps stored on hard disk 45 to allow spectral gamut mapping module 142 to convert color values corresponding to colors of an image from the source device to the destination device. In doing so, spectral gamut mapping module 142 performs spectral gamut mapping for reproducing an image on the destination device using gamut mapping data structures 146 and device profile 147.

Gamut mapping data structures 146 and device profile 147 are files generated during an off-line phase typically occurring in a device profiling process at a device manufacturer's facility. Such files can be stored to a computer readable memory medium and shipped to a user of host computer 41 for installation onto hard disk 45. During an on-line phase, such as when the user initiates a printing request on host computer 41, such files can be retrieved and used in spectral color reproduction.

Figure 3:
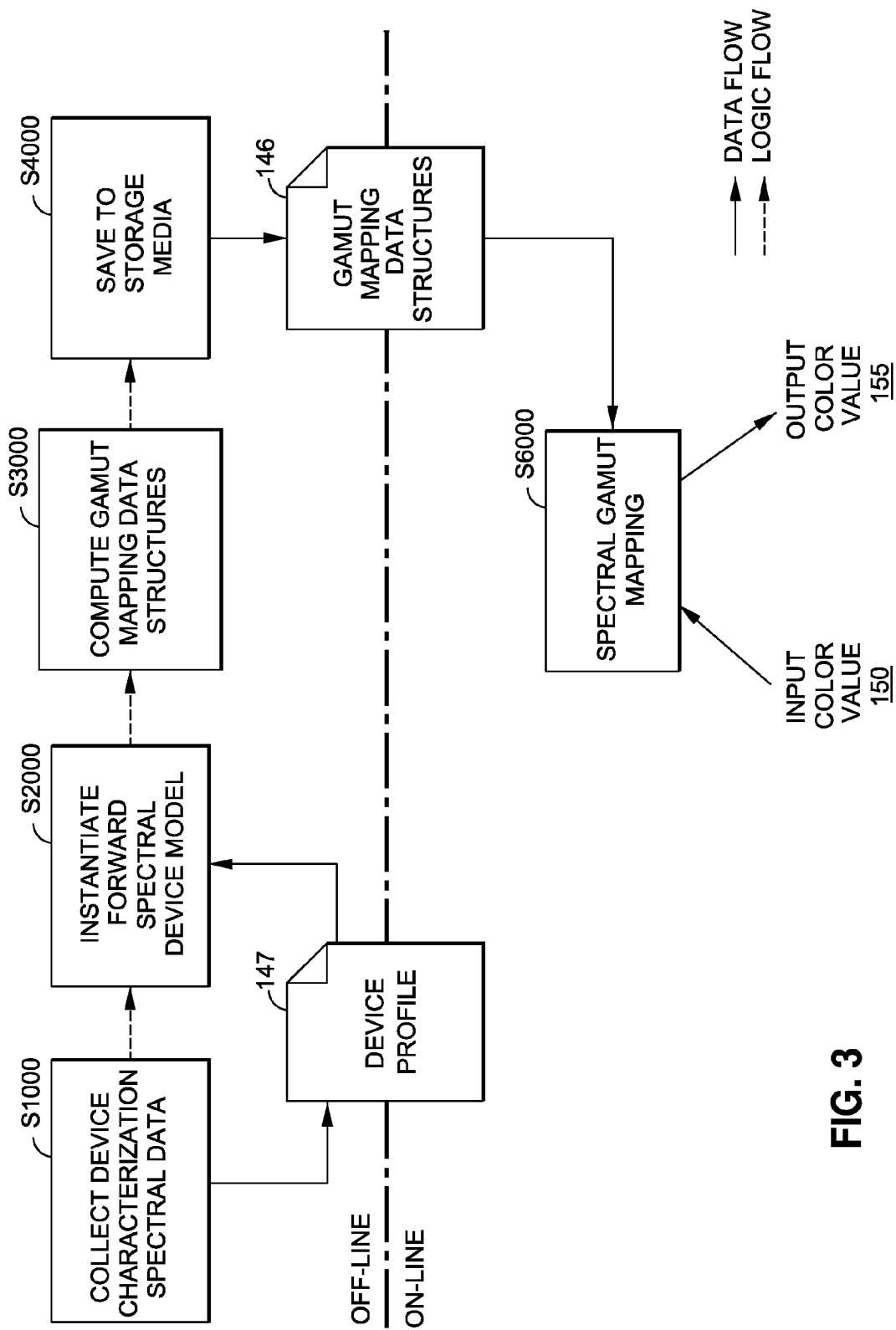
FIG. 3 is a diagram depicting the high level process steps in the off-line and on-line phase according to an example embodiment.

FIG. 3 is an overall representative view of an off-line phase for determining a spectral gamut of a device and an on-line phase for performing spectral gamut mapping according to an example embodiment.

Briefly from FIG. 3, in an off-line phase typically occurring in a device profiling process, device characterization spectral data is collected in step S1000 and used to create device profile 147. In step S2000, forward spectral device model 140 is instantiated using device profile 147. In addition, gamut mapping data structures are computed in step S3000, and are saved to storage media in step S4000 as gamut mapping data structures 146.

In more detail, in step S1000 of the off-line phase, device characterization spectral data is collected that can include spectral measurements of color samples produced by the output device. This device characterization spectral data is saved in step S1000 as device profile 147, which can be installed on host computer 41 and accessed during the on-line phase.

In step S2000, forward spectral device model 140 is instantiated using device profile 147. A forward spectral device model is a mathematical representation of a physical device based on collected measurements, such as the measurements collected in step S1000, such that it can predict the spectral reflectance of colors that are not present in the collected measurements. In the case of the device being a multi-ink printer, such as printer 90, modeling methods such as the "Cellular Yule-Nielsen Spectral Neugebauer Model" have been successfully used to model a printer based on spectral measurements of 4000-6000 color patches. Techniques based on other physical ink mixing theories such as Kubelka-Munk theory may also yield acceptable forward spectral device models for printers. The forward spectral device model relates device value to spectral reflectance, which is represented as an array of values referred to herein as a spectral reflectance array. By applying the forward spectral device model to device values corresponding to printable ink combinations, a spectral reflectance array corresponding to each device value may be obtained.

In step S3000, gamut mapping data structures are computed. Gamut mapping data structures comprise a data structure called a "constrained subdivision" of the spectral gamut and another data structure for computational efficiency called an "auxiliary computational data structure". Step S3000 is explained below in greater detail with reference to FIG. 4.

Figure 4:
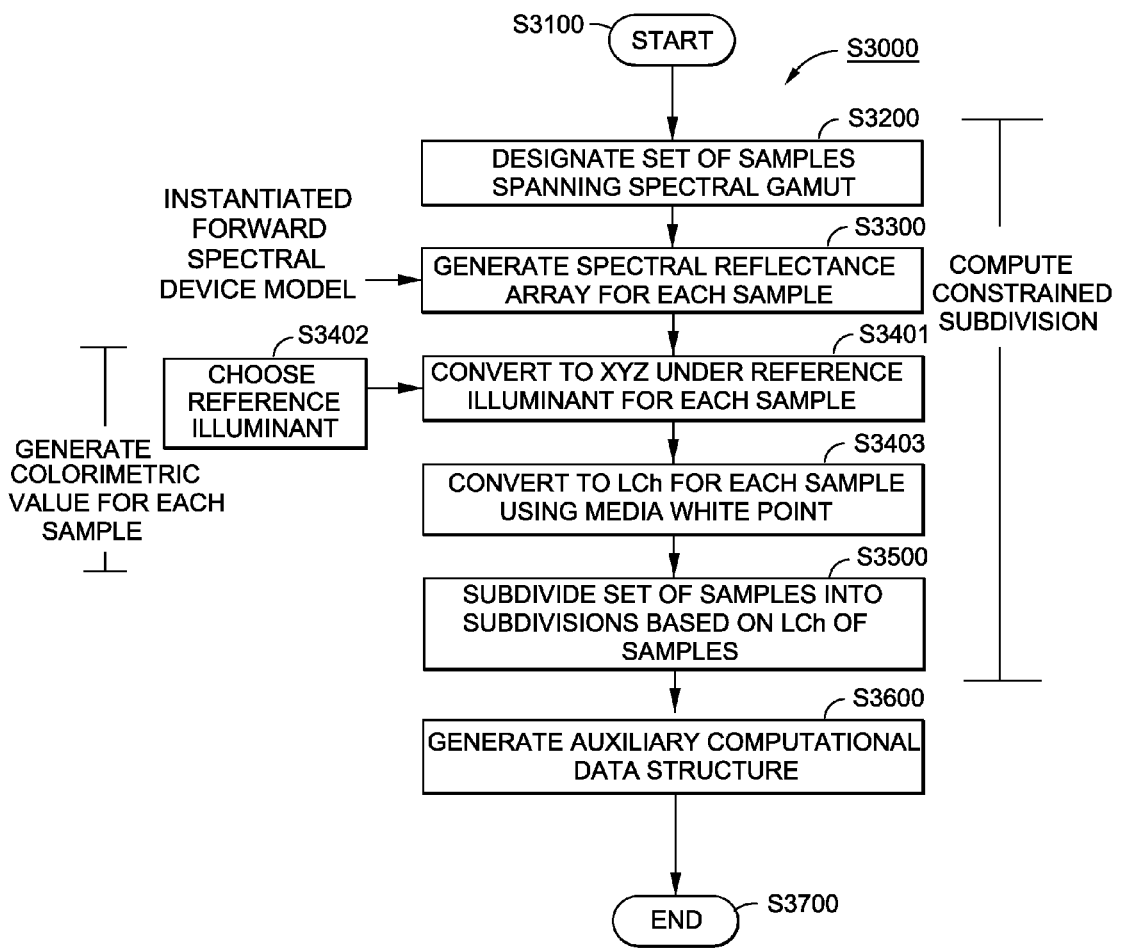
FIG. 4 is a flow diagram depicting process steps of the off-line phase according to an example embodiment.

FIG. 4 is a flow diagram illustrating the process steps included in step S3000 according to an example embodiment.

Briefly, after starting the process at step S3100, a spanning set of samples spanning the spectral gamut of the device is designated in step S3200 by specifying plural device values in a device color space. In step S3300, a spectral reflectance array is generated for each sample using the forward spectral device model instantiated in step S2000 and the device value corresponding to the sample. A colorimetric value for each spectral reflectance array is then generated in steps S3401 to S3403 by transforming the spectral reflectance array corresponding to the sample under a reference illuminant. The colorimetric value is defined in a lightness-chroma-hue (LCh) space and has a lightness in a lightness dimension, a chroma in a chroma dimension and a hue in a hue dimension. In step S3500, the computation of the constrained subdivision is completed by subdividing the set of samples into subdivisions based on the lightness, chroma and hue of the samples such that the number of samples in each subdivision is limited by a predetermined number. In step S3600, the auxiliary computational data structure is computed, and the process ends at step S3700.

In more detail, in step S3200, a large spanning set of samples is designated so as to span the spectral gamut of the device. As described in more detail below in reference to FIG. 26, the designation of a spanning set is accomplished by establishing a first crude spanning set of samples and then refining the first crude spanning set by selectively adding new samples. More specifically, a new sample is added to the first crude spanning set if the new sample differs in an objective function value by more than a predetermined threshold from all samples in the first crude spanning set. The resulting first crude spanning set, as modified by the addition of new samples, is then designated as the spanning set of samples.

Figure 26:
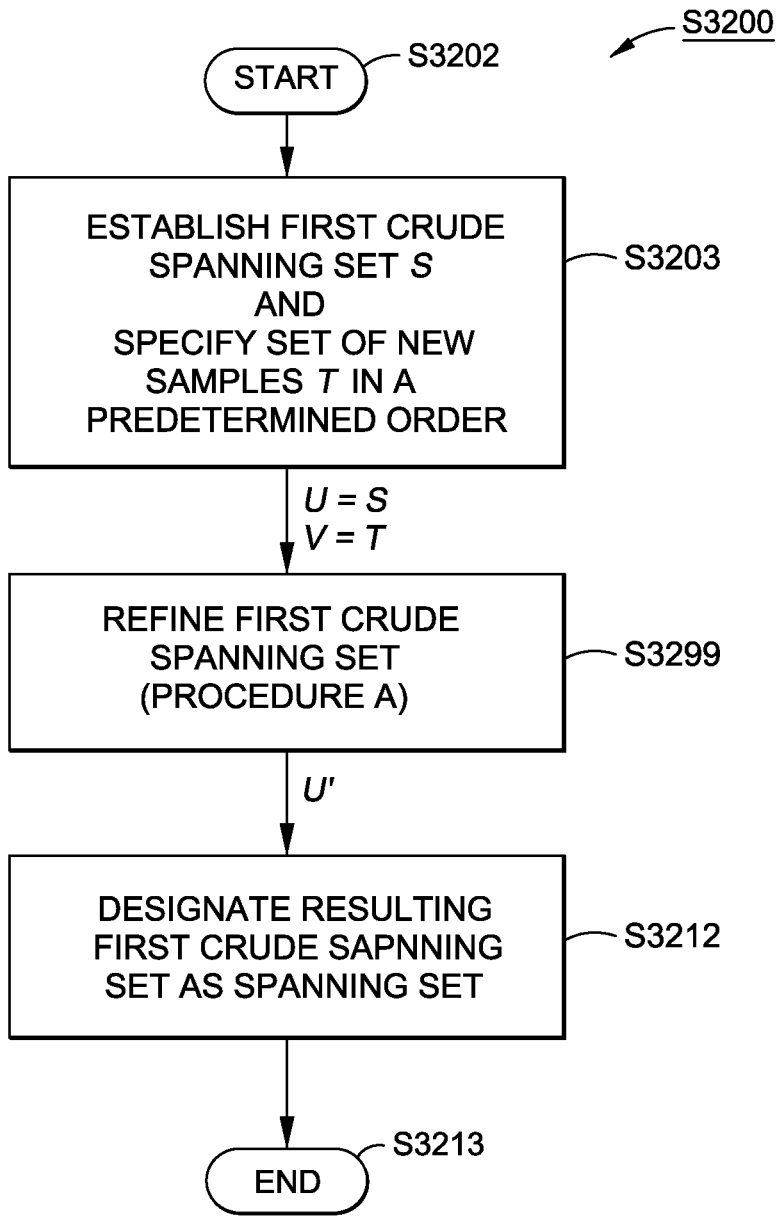
FIG. 26 is a flow diagram depicting the process steps in an example embodiment of designating a set of samples spanning a spectral gamut.

Refer now to FIG. 26, which shows the process steps inside S3200 of FIG. 4. The process starts at step S3202. In step S3203, a first crude spanning set S of samples is established by specifying one or more corresponding device values in a device color space. A set T of new samples is specified in a predetermined order by specifying corresponding device values in the device color space. In step S3299, the first crude spanning set is refined by processing the plurality of new samples in a predetermined order, according to the predetermined order of the samples in the set of new samples. This step is performed by invoking a procedure called Procedure A, which accepts as inputs two sample sets U and V, and outputs a sample set U'. In FIG. 26, Procedure A is invoked with U=S, V=T.

Figure 27:
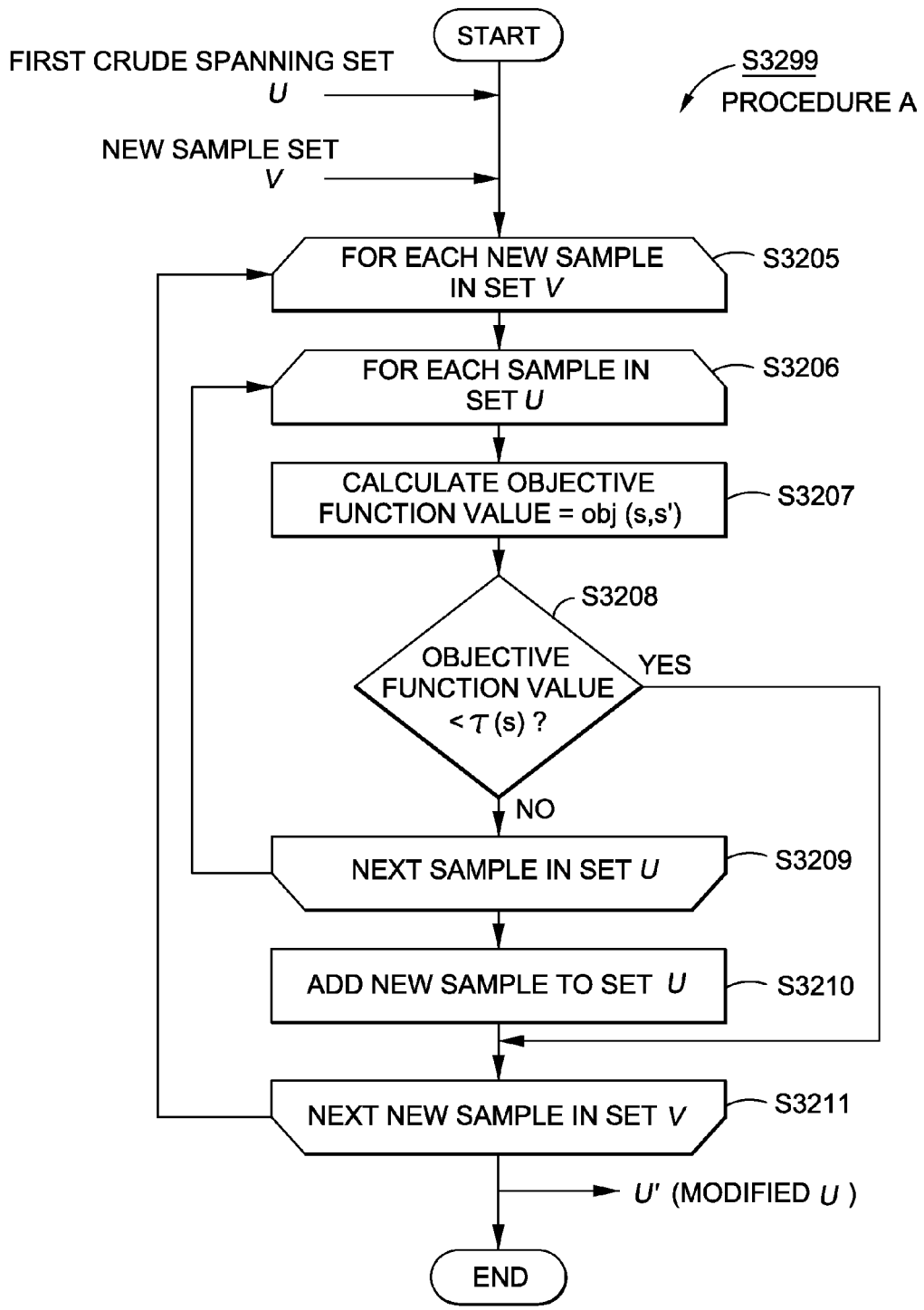
FIG. 27 is a flow diagram depicting the process steps in Procedure A.

Refer now to FIG. 27, which shows the process steps inside step S3299 of FIG. 26. In the loop defined by S3205 and S3211, for each new sample in V, a sub-loop is initiated for each sample in U. In step S3207, an objective function value is calculated for the current new sample and the current sample in the first crude spanning set.

The objective function value is based on an objective function that relates to the human visual threshold. In this example embodiment, the following objective function is used:

$$\text{Obj}(s,s')=\max_{I\in\{D50,D65,A,F2,F7,F11\}}\Delta E(s,s',I) \quad \text{(Equation 1)}$$

Here, s and s' are two spectral reflectance arrays corresponding to the current new sample and the current sample in the first crude spanning set, respectively. The spectral reflectance arrays s and s' are generated by processing the device values corresponding to the current new sample and the current sample in the first crude spanning set through the forward spectral device model built in step S2000 of FIG. 3.

In addition, $\Delta E(s,s',I)$ denotes a delta-E between the two spectral reflectance arrays under an illuminant I. The delta-E equation chosen can be $\Delta E_{ab}$, $\Delta E_{94}$ or other delta-E equations. The set of illuminants can be chosen to reflect a range of representative illuminants. For example, illuminant D50 is a daylight illuminant, illuminant A is an incandescent illuminant, and F2, F7 and F11 are fluorescent illuminants with different characteristics in their spectral power distribution.

In more detail, if the delta-E equation used is $\Delta E_{ab}$, $\Delta E(s,s',I)$ can be computed using the following procedure. First, the CIEXYZ values of the two spectral reflectances under the illuminant I can be calculated using the following equations:

$$X = \int_{400}^{700} s(\lambda)I(\lambda)\bar{x}(\lambda)\,d\lambda \quad \text{(Equation 2)}$$

$$Y = \int_{400}^{700} s(\lambda)I(\lambda)\bar{y}(\lambda)\,d\lambda \quad \text{(Equation 3)}$$

$$Z = \int_{400}^{700} s(\lambda)I(\lambda)\bar{z}(\lambda)\,d\lambda \quad \text{(Equation 4)}$$

where $\bar{x}$, $\bar{y}$ and $\bar{z}$ are the CIE Color Matching Functions. There is a similar set of equations for s' to obtain X'Y'Z'. The XYZ and X'Y'Z' can then be converted to CIELAB values using the following equations:

$$L = 116 f(Y/Y_0) - 16 \quad \text{(Equation 5)}$$

$$a = 500[f(X/X_0) - f(Y/Y_0)] \quad \text{(Equation 6)}$$

$$b = 200[f(Y/Y_0) - f(Z/Z_0)] \quad \text{(Equation 7)}$$

$$f(x) = \begin{cases} x^{1/3} & \text{if } x > (6/29)^3 \\ 1/3(29/6)^2 x + 4/29 & \text{if } x \le (6/29)^3 \end{cases} \quad \text{(Equation 8)}$$

where $X_0$, $Y_0$, $Z_0$ are the CIEXYZ value of the white point of the illuminant. There is a similar set of equations for X'Y'Z' to obtain L'a'b'. Finally, $\Delta E_{ab}$ is given by:

$$\Delta E_{ab}(s,s',I)=\sqrt{(L-L')^2+(a-a')^2+(b-b')^2} \quad \text{(Equation 9)}$$

If the delta-E equation used is $\Delta E_{94}$, the following set of equations can be used to calculate $\Delta E_{94}$:

$$\Delta L = L - L' \quad \text{(Equation 10)}$$

$$C = \sqrt{a^2 + b^2} \quad \text{(Equation 11)}$$

$$C' = \sqrt{a'^2 + b'^2} \quad \text{(Equation 12)}$$

$$\Delta C = C - C' \quad \text{(Equation 13)}$$

$$\Delta H = \sqrt{(a-a')^2 + (b-b')^2 - (\Delta C)^2} \quad \text{(Equation 14)}$$

$$\Delta E_{94}(s,s',I) = \sqrt{(\Delta L/k_L S_L)^2 + (\Delta C/k_C S_C)^2 + (\Delta H/k_H S_H)^2} \quad \text{(Equation 15)}$$

where $k_L = k_C = k_H = S_L = 1$, $S_C = 1 + 0.045C$ and $S_H = 1 + 0.015C$.

In step S3208, it is determined whether the objective function value calculated in step S3207 is less than a predetermined threshold, $\tau(s)$. A simple example of a choice for the predetermined threshold is the constant function $\tau(s)=1$. In this case, for the sub-loop defined by S3206 and S3209, step S3208 determines whether the current new sample is at least 1 $\Delta E$ apart from every sample already in the first crude spanning set under at least one illuminant.

In alternative embodiments, $\tau(s)$ varies depending on the region from which the current sample is located in the spectral gamut. For example, if the current sample is located in a critical region such as a region corresponding to flesh tone colors, then a determination is made that the critical region requires more sampling. New samples within the critical region then use a smaller predetermined threshold in step S3208, such as $\tau(s)=0.5$, while new samples outside the critical region use a larger predetermined threshold, such as $\tau(s)=1$.

If one of the samples in U gives an objective function value greater than or equal to $\tau(s)$ ("YES" at step S3208), the process proceeds to step S3211 at which the next new sample is retrieved. If all of the samples in U have been processed in the sub-loop defined by S3206 and S3209 ("NO" at step S3208 for all samples in U), then the current new sample differs in the objective function value by at least the predetermined threshold from all samples in U. In such a case, the process proceeds to step S3210 to add the current new sample to the set U. The addition of the current new sample modifies the set U such that there is one more sample to be processed in the sub-loop defined by S3206 to S3209 before any subsequent new sample can be added to the set U in step S3210.

Returning to FIG. 26, the resulting set U' from FIG. 27, as modified by the addition of any new samples, is designated as the spanning set in step S3212. The process then ends at step S3213.

First Embodiment of Establishing First Crude Spanning Set and New Samples

In the first embodiment of the step S3203, the first crude spanning set can consist of one sample corresponding to the media white point. In the case of a color printer, this corresponds to a device value with no colorants. This sample set is denoted $S_0$.

For the new samples, the specification of device values can be obtained by a strategy called stratified sampling, which is described as follows.

By way of motivation, the number of samples specified can be limited by restricting the maximum number of inks to be used out of a total number of inks available when printing a color. Thus, if there are J inks, and n+1 steps are sampled in each ink channel, then the total number of three-or-less-ink combinations can be calculated as follows:

$$\binom{J}{3} \cdot n^3 + \binom{J}{2} \cdot n^2 + J \cdot n + 1 \qquad \text{(Equation 16)}$$

For example, if there are six inks (J=6), and n=51 (i.e., steps of five digital counts, or about 2%), then the total number of device values, and therefore the total number of samples, is 2,692,342.

Figure 5:
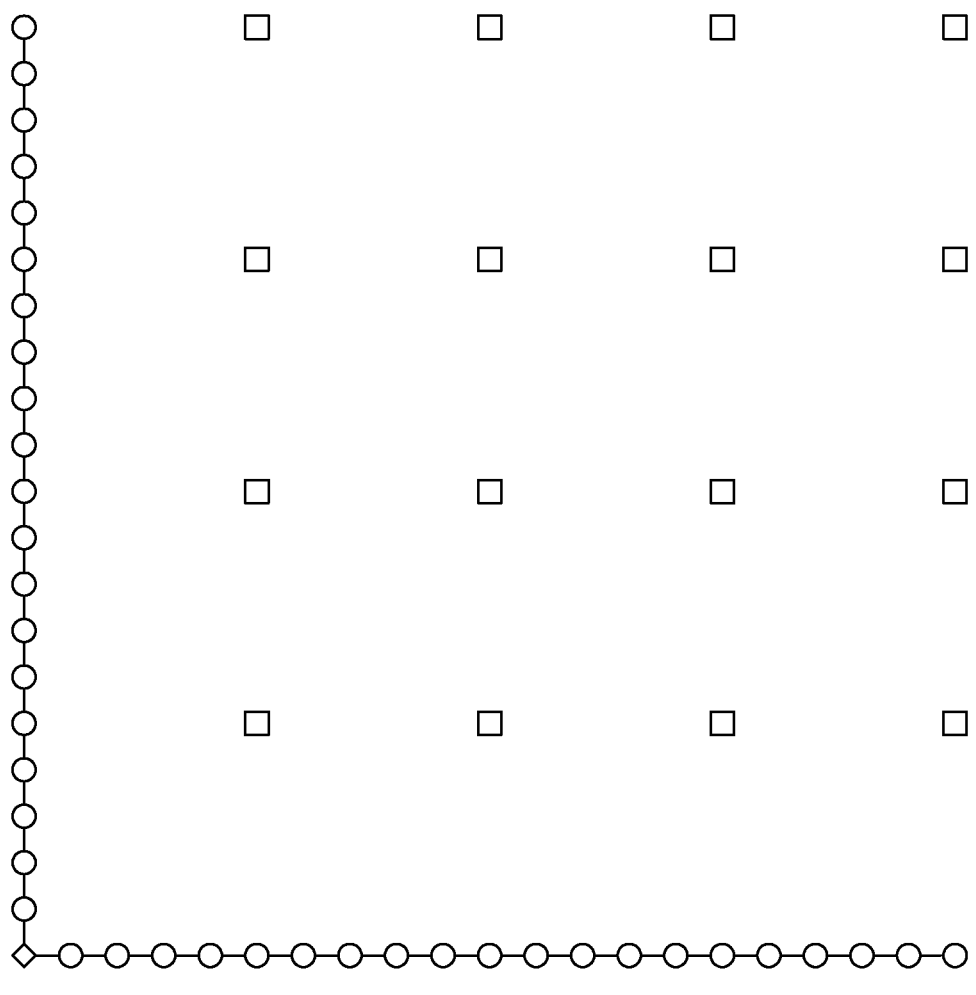
FIG. 5 is a representative view of stratified sampling of a device space for use in designating samples according to an example embodiment.

With reference to FIG. 5, a more general formula, corresponding to a stratified sampling of the device color space, can be used to specify device values. FIG. 5 illustrates a stratified sampling of a hypothetical two-dimensional device space. Such stratified sampling can generally allow sampling of the device color space at different sampling rates, depending on the dimension of the stratum. A general formula for the stratified sampling can be as follows:

$$\sum_{i=0}^{J} \binom{J}{i} \cdot n_i^i, \qquad \text{(Equation 17)}$$

where $n_i+1$ steps are used in sampling all i-dimensional strata. The above-mentioned example of three or less inks corresponds to the case J=6, $n_0$=1, $n_1$=$n_2$=$n_3$=51 and $n_4$=$n_5$=$n_6$=0. Similarly, four or less inks in an ink combination can be allowed, with the sampling rate for 4-ink combinations being reduced. For example, the values of J=6, $n_0$=1, $n_1$=$n_2$=255, $n_3$=51, $n_4$=17, $n_5$=$n_6$=0 can be used. This results in the inclusion of four-ink combinations, but at a reduced sampling rate of 18 steps and a total "nominal" number of 4,882,741. The number is called "nominal" because of ink limiting, as explained in the following.

It should be noted that not all ink combinations are printable. Even when only three inks are printed at a time, not all combinations are printable due to the fact that the paper may only hold up to a certain total ink coverage. As a result, the actual printable ink combinations may be significantly lower in number than the nominal total number of ink combinations. For example, after ink limiting is applied to a Canon i9900™ inkjet printer with CMYKRG inks (i.e., six inks), the number of printable three-ink combinations described above is reduced to 1,285,896 in an example embodiment, and the number of printable four-ink combinations described above is reduced to 2,317,811 in an example embodiment.

In one example embodiment of specifying a plurality of new samples in a predetermined order, the plurality of new samples is specified by specifying individual strata named $T_1$, $T_2$, $T_3$, $T_4$, $T_5$, $T_6$ and $T_7$. The plurality of new samples is formed by appending the samples in each stratum in the order they appear inside the stratum. Furthermore, the appending of the strata is done according to the ordering of the strata, i.e., $T_1$, followed by $T_2$, then $T_3$ and so on.

In more detail, $T_1$ and $T_2$ correspond to strata of 1-ink and 2-ink combinations respectively. For example, the device values in $T_1$ are determined by: (0, 0, ..., $x_j$, ..., 0), where j is one of the ink channels from 1, 2, ... to J, and $x_j$ takes any value from 1 to 255. There are a total of J·255 samples in this set.

Similarly, the device values in $T_2$ are determined by: (0, 0, ..., $x_j$, ..., $x_k$, ..., 0, 0), where j and k are two channels from 1, 2, ... to J, with j<k. In addition, $x_j$ and $x_k$ take any value from 1 to 255. There are a total of $$\binom{J}{2} \cdot 255^2$$

samples in this set.

For $T_3$, $T_4$ and on, sampling steps are reduced because of the large number of samples involved. Ultimately, the determining factors are ordinarily computing resources such as availability of a large amount of memory, and computing power. In the example embodiment, the sampling steps in each ink are determined as follows:

$T_3$: 1, 2, ..., 31, 32, 34, 36, ..., 62, 64, 65, 68, 71, ..., 122, 125, 128, 129, 133, 137, ..., 181, 185, 189. The stratum consists of 3-ink combinations and the "nominal" total number of samples (i.e., not counting device values not printable due to total ink coverage limit) is $$\binom{J}{3} \cdot 86^3 = 12,721,120.$$

$T_4$: 1, 3, 5, ..., 13, 15, 20, 25, 30, ..., 115, 120, 125. The stratum consists of 4-ink combinations and the "nominal" total number of samples for this stratum is $$\binom{J}{4} \cdot 30^4 = 12,150,000.$$

$T_5$: 5, 10, 15, ..., 65, 70, 75. The stratum consists of 5-ink combinations and the "nominal" total number of samples for this stratum is $$\binom{J}{5} \cdot 15^2 = 4,556,250.$$

$T_6$: 5, 10, 15, ..., 50, 55, 60. The stratum consists of 6-ink combinations and the "nominal" total number of samples of $12^6$=2,985,984.

The choice in the sampling steps is made primarily to keep the number of samples in check, such as a target of "within millions of device values" for each stratum. For example, with more computing resources available, the number of sampling steps can be made larger, which is generally preferred as a more precise sampling of the gamut can ordinarily result. In addition, if there are more inks in the printer, a similar sampling strategy can be adopted, with a view on the computing capability available.

The sampling in device color space can also be strategically performed in local areas. For example, in the example embodiment, a decision is made to enhance the resolution of the sampling in the near white area. An additional sample set, $T_7$, is specified by the following sampling step description:

$T_7$: 0, 1, 2, ..., 8, 9 10. The sampling is applied to each ink, resulting in a "nominal" total number of samples of $11^6$=1,771,561.

Note that $T_7$ is a full six-ink sampling but is limited to only the first 10 digital counts in each ink channel. A similar strategy can be used to increase sampling resolution in traditionally critical areas such as flesh colors.

In this embodiment, the order in which the new samples are established determines the order for processing the new samples. Given that the loop defined by S3205 and S3211 in FIG. 27 adds new samples to the first crude spanning set sequentially, it follows that if there are any "preferred" new samples, they should appear first in the set of new samples before those that are less preferred.

Additionally, preferred samples can also be established as part of the first crude spanning set in step S3203 of FIG. 26. As noted above, in this embodiment, the first crude spanning set consists of one sample corresponding to the media white point. The sample corresponding to the media white point can be viewed as a preferred sample. Other choices of preferred samples may include colors resulting from one ink (primary) or two inks (secondary). However, it is noted that the determination of any preferred samples will generally depend upon the specific application.

Second Embodiment of Establishing First Crude Spanning Set and New Samples

It is noted that in the first embodiment, the processing of the new samples in Procedure A is done serially. However, many modern computing hardware supports multiple threads. The second embodiment allows multiple processing threads executing in parallel and can ordinarily benefit from computing hardware with multiple processing cores or otherwise supporting multiple execution threads.

Figure 28:
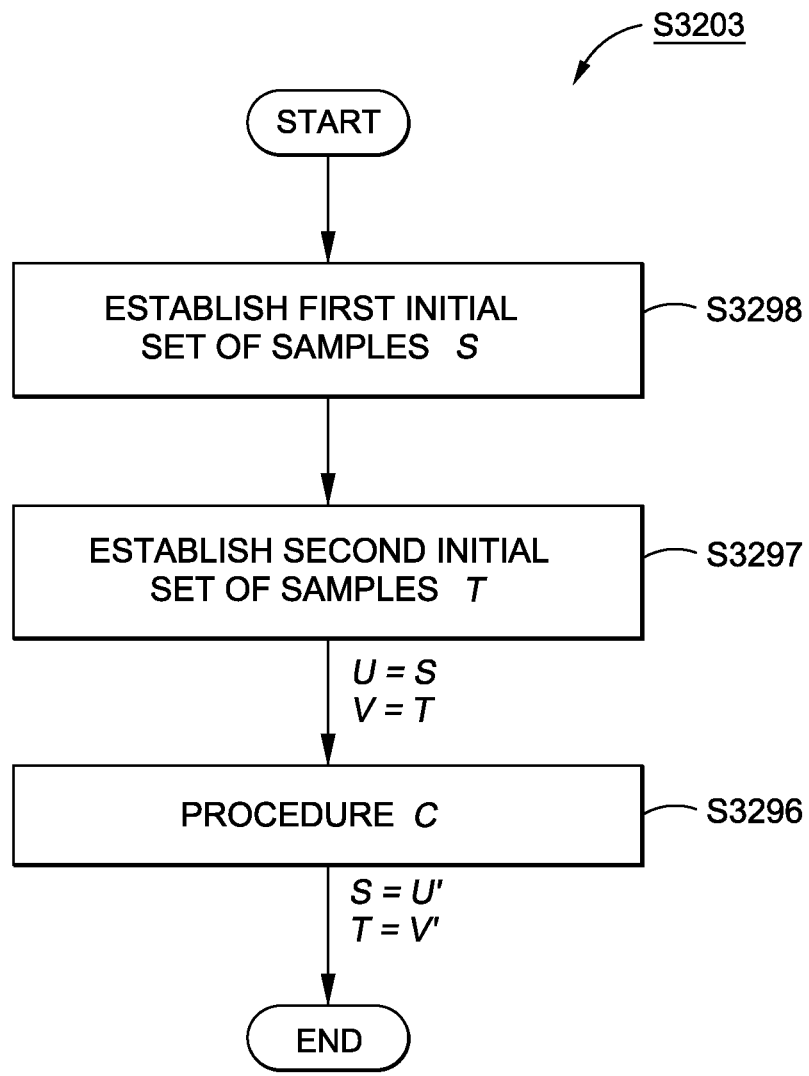
FIG. 28 is a flow diagram depicting the process steps in an example embodiment of establishing a first crude spanning set and specifying a set of new samples.

Refer now to FIG. 28, which shows the process steps in a second embodiment of step S3203 of FIG. 26. In step S3298, a first initial set S of samples is established by specifying one or more corresponding device values in the device color space. In step S3297, a second initial set T of samples is established by specifying corresponding device values in the device color space. In an example embodiment, these two steps can be similar to the first embodiment of step S3203 described above. In other words, S can be taken to be $S_0$, and T can be taken to be the union of $T_1, T_2, T_3, \ldots, T_7$.

The initial sets S and T are then processed in step S3296 by invoking Procedure C, which is described in detail below. In general, Procedure C takes as inputs two sample sets U and V, and outputs two modified sample sets U' and V'. In FIG. 28, the inputs U and V are taken to be S and T respectively, and the outputs U', V' of Procedure C are taken to be the first crude spanning set S and the new samples T respectively in FIG. 26.

Figure 29:
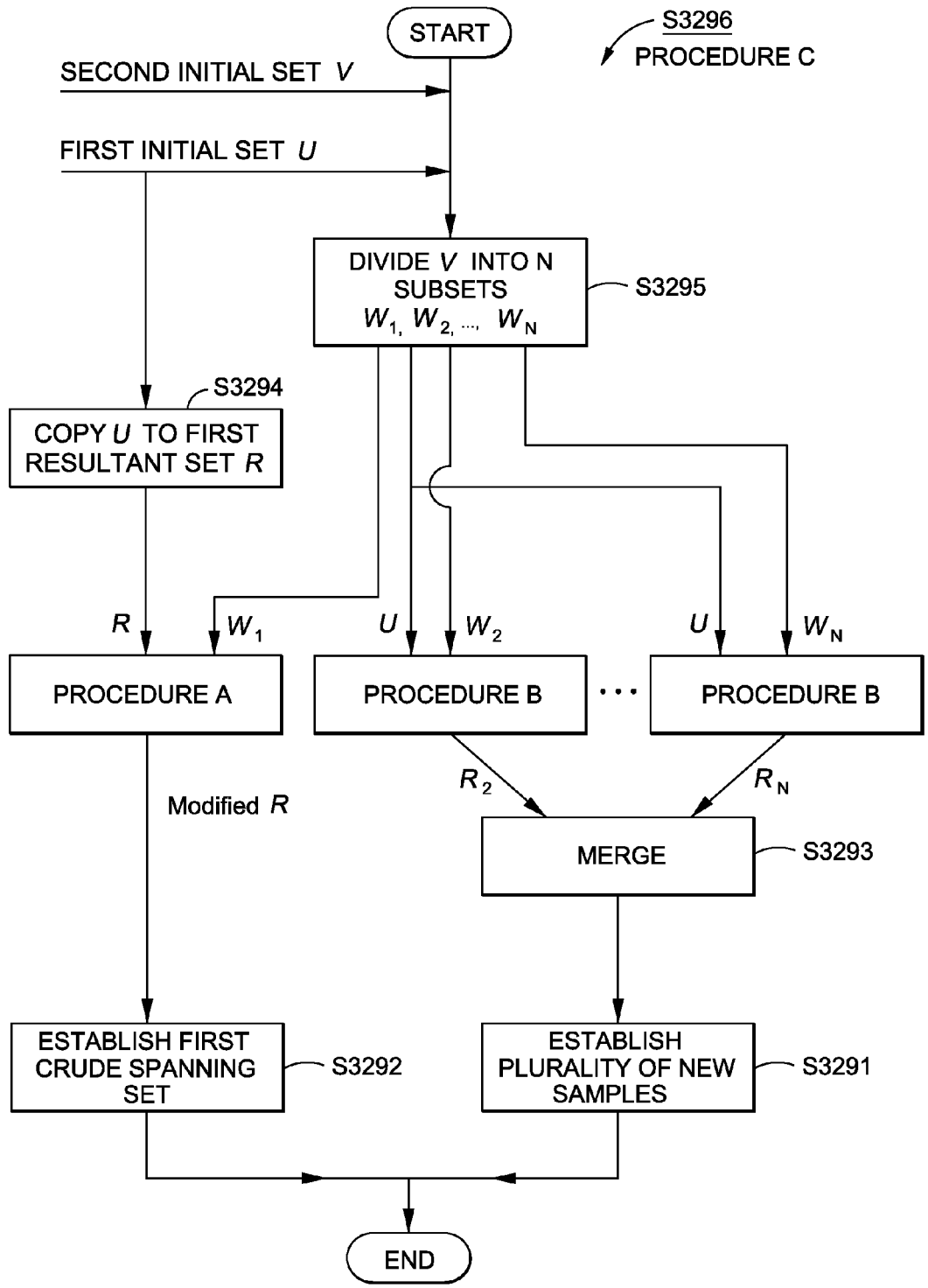
FIG. 29 is a flow diagram depicting the process steps in Procedure C.

Refer now to FIG. 29, which shows the process steps of step S3296 in FIG. 28. In general, Procedure C takes as inputs a first initial set U and a second initial set V. In step S3295, the set V is divided into N subsets $W_1, W_2, \ldots, W_N$, where N is two or more. For example, N=8 can be a reasonable choice for a computing hardware with four processing cores, such as a quadcore computer. In step S3294, U is copied to a first resultant set R. The first resultant set R and the first subset $W_1$ are processed by invoking Procedure A as explained in FIG. 27, the processing of which includes, for each sample in $W_1$, determining if it does or does not differ in an objective function value by more than a predetermined threshold from all samples in the first resultant set R, and adding it to R if it does. The first initial set U and each of the remaining subsets $W_2, \ldots, W_N$ are processed by invoking Procedure B, to be explained below, the processing of which includes, for each sample in a given remaining subset $W_i$, where i=2, . . . , N, determining if it does or does not differ in an objective function value by more than the predetermined threshold from all samples in U, and adding it to a resultant set $R_i$ if it does.

The processing of each subset can be performed concurrently with the processing of other subsets so as to benefit from parallel computing hardware if available. In step S3293, the resultant sets $R_2, \ldots, R_N$ are merged to form a combined resultant set. In step S3292, the modified first resultant set R is established as the first crude spanning set. In step S3291, the combined resultant set is established as the plurality of new samples, and the process of step S3296 ends.

Figure 30:
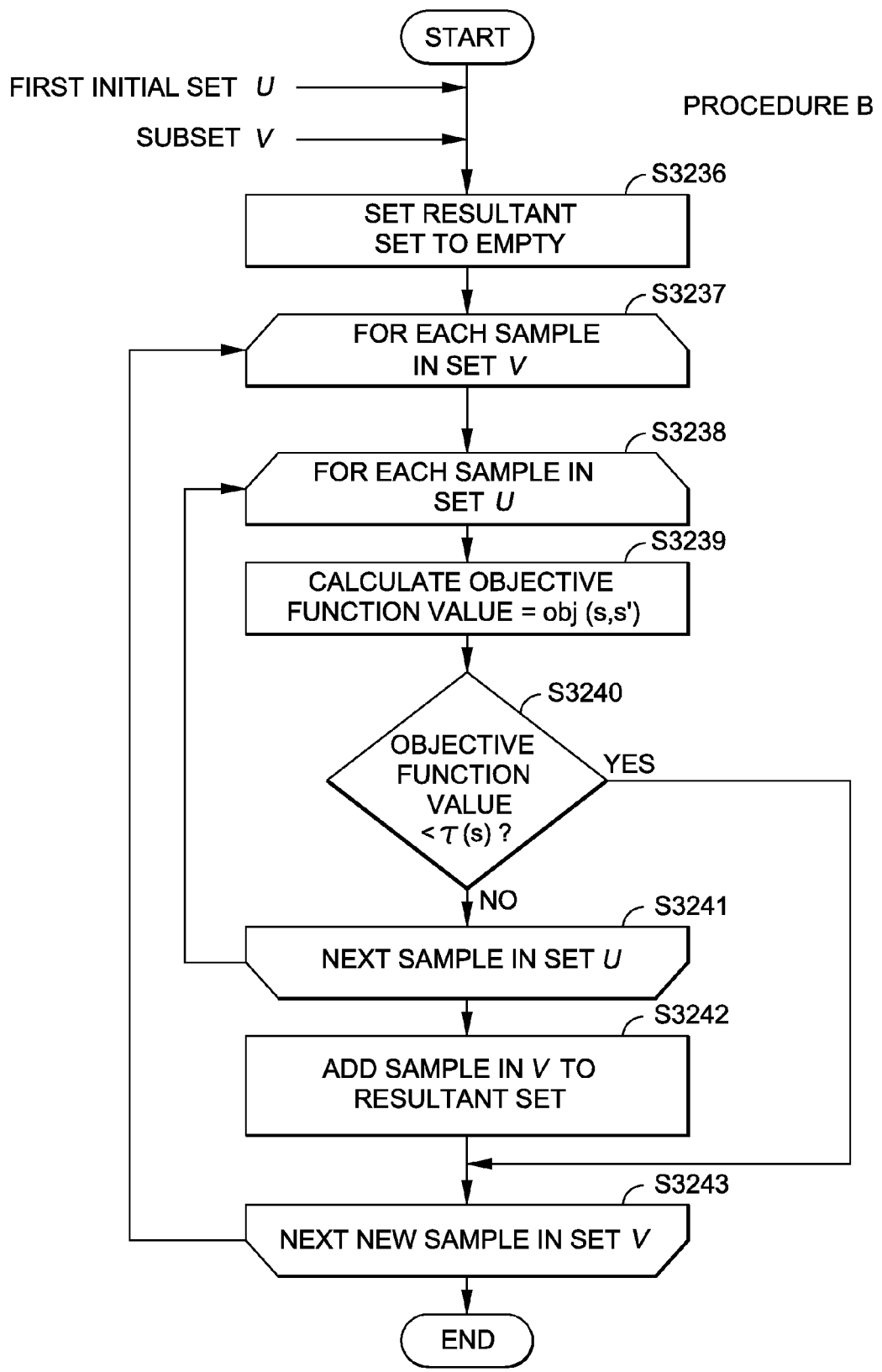
FIG. 30 is a flow diagram depicting the process steps in Procedure B.

Lastly, an explanation of Procedure B will be provided. Refer now to FIG. 30, which shows the process steps inside Procedure B of FIG. 29. In general, Procedure B takes as inputs a first initial set U, a subset V and outputs a resultant set. In step S3236, the resultant set is initially set to be an empty set. In the loop defined by S3237 and S3243, for each new sample in V, a sub-loop is initiated for each sample in U. In step S3239, an objective function value is calculated for the current sample in V and the current sample in U. The objective function is the same objective function used in Procedure A described above.

In step S3240, it is determined whether the objective function value calculated in step S3239 is less than a predetermined threshold, $\tau(s)$. $\tau(s)$ is the same threshold used in Procedure A described above.

If one of the samples in U gives an objective function value greater than or equal to $\tau(s)$ ("YES" at step S3240), the process proceeds to step S3243 at which the next sample in V is retrieved. If all of the samples in U have been processed in the sub-loop defined by S3238 and S3241 ("NO" at step S3240 for all samples in U), then the current sample in V differs in the objective function value by at least the predetermined threshold from all samples in U. In such a case, the process proceeds to step S3242 to add the current sample to the resultant set. Then the process continues to step S3243 to retrieve the next sample in V.

Third Embodiment of Establishing First Crude Spanning Set and New Samples

In a third embodiment, Procedure C is iteratively invoked until the size of the second initial set decreases below a predetermined threshold size M. In this regard, it is noted that in general, dividing data into N subsets and running a program on N threads concurrently does not typically reduce the runtime linearly. In other words, runtime is not typically reduced by a factor of 1/N compared to running the program on one thread. This is because of the overhead needed, for example, to maintain the threads. In practical terms, this means that parallel execution is typically only beneficial for large sample sets. The threshold M can for instance be taken to be 250,000.

Figure 31:
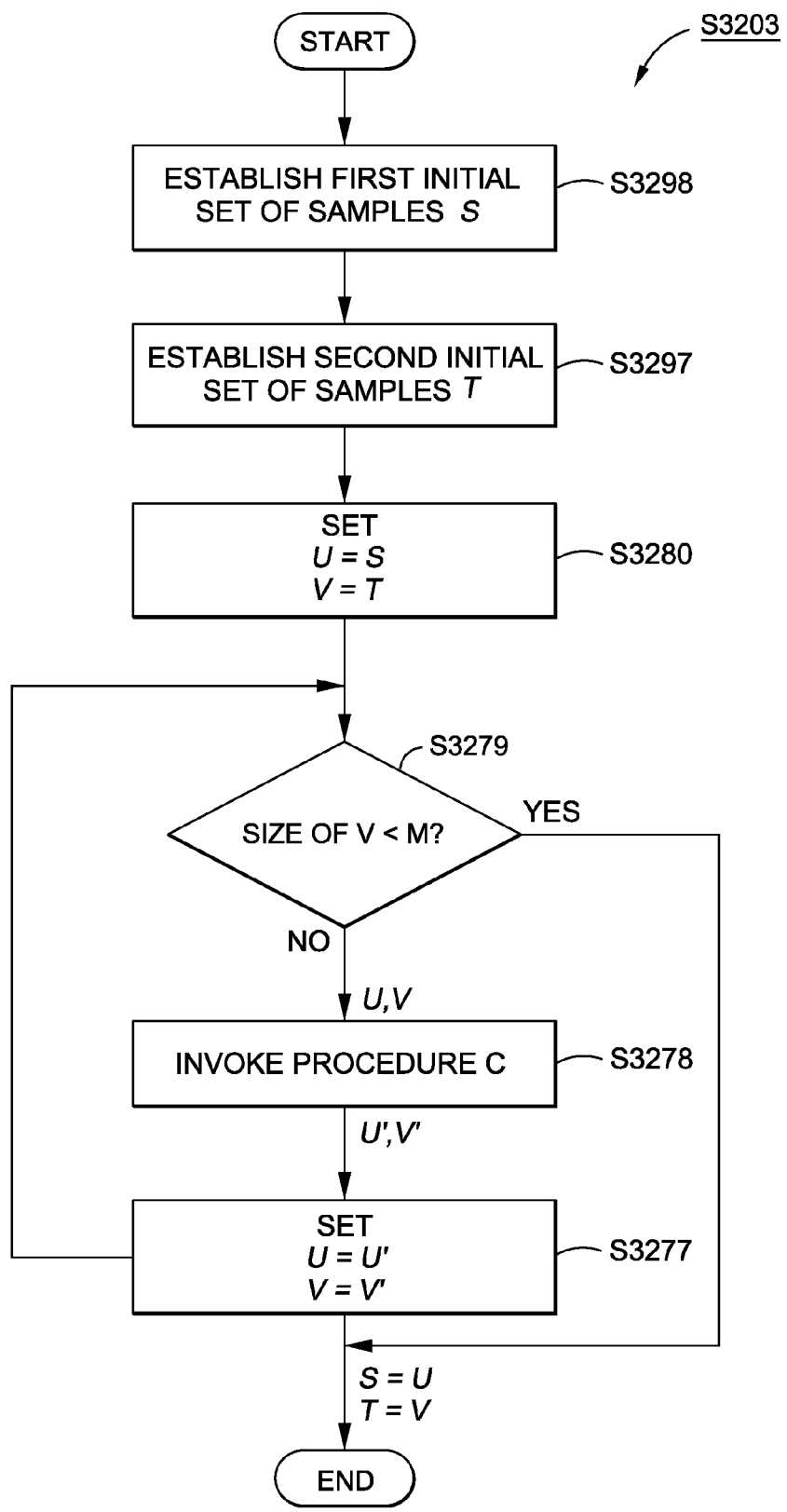
FIG. 31 is a flow diagram depicting the process steps in another example embodiment of establishing a first crude spanning set and specifying a set of new samples.

Refer now to FIG. 31, which shows the process steps for a third embodiment of step S3203 of FIG. 26. Steps S3298 and S3297 can be identical to the corresponding steps in the second embodiment as described in FIG. 28. In step S3280, the inputs U and V for Procedure C are set to the first initial set S and the second initial set T respectively. In step S3279, it is determined if the size of V is less than the threshold size M or not. If the size of V is less than M ("YES" in step S3279), the process terminates, and the first initial set S and the second initial set T will be used as the first crude spanning set and the set of new samples respectively in step S3299 of FIG. 26. If the size of V is not less than M ("NO" in step S3279), the process proceeds to step S3278 to invoke Procedure C with inputs U and V. In step S3277, the outputs U', V' of Procedure C are used to replace the current U and V, and the process returns to step S3279 to check the size of the current V. The process terminates when the checking in step S3279 returns a "YES". It is noted that termination will eventually occur because after each invocation of Procedure C, the size of V is reduced by at least a factor of (N−1)/N.

Figure 32:
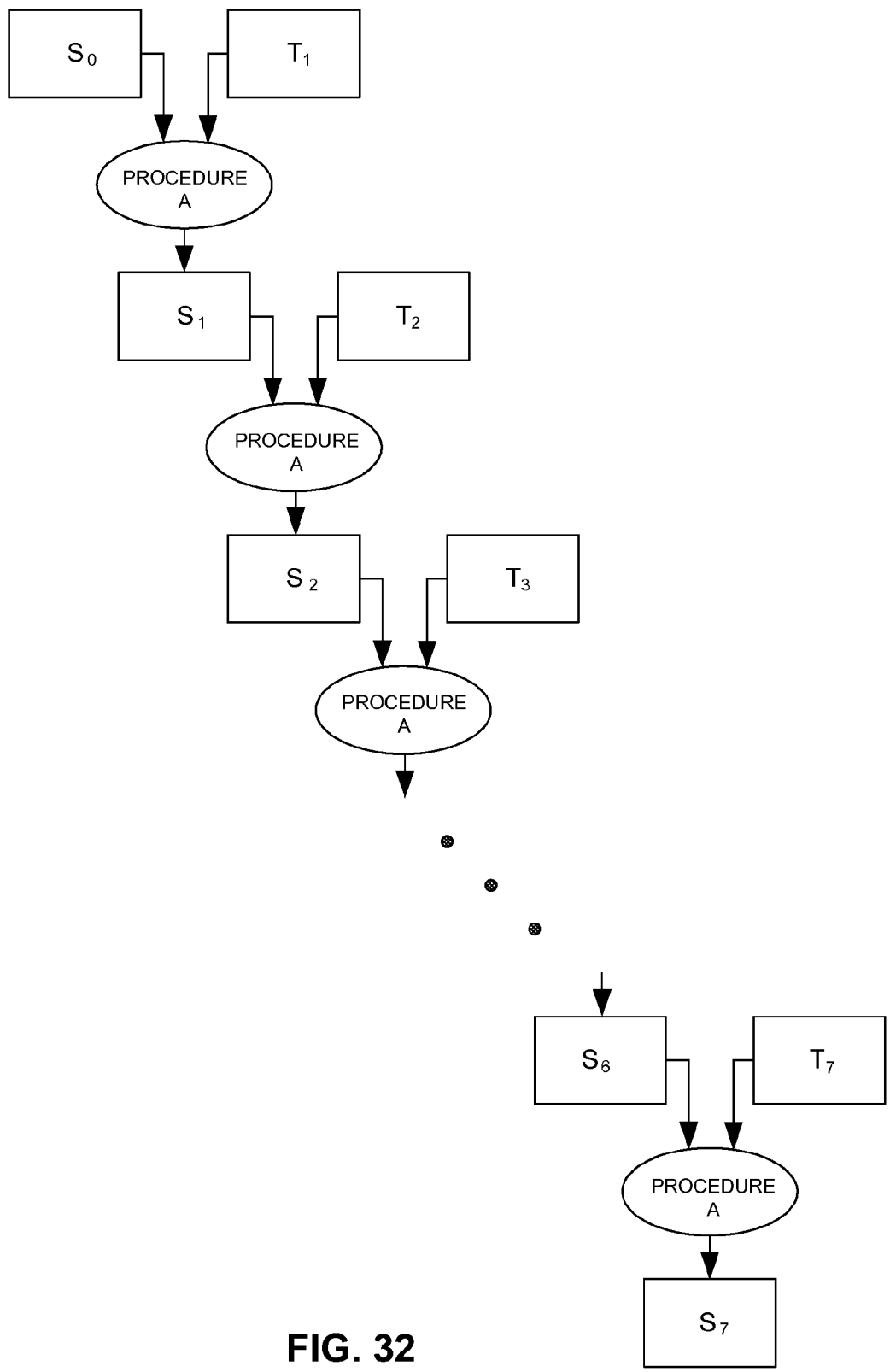
FIG. 32 is a conceptual view of designating a spanning set of samples according to an example embodiment.

Finally, it is noted that while the set of new samples T is depicted as a single set, for example, in FIG. 26, the processing could be broken down into successive steps. This is particularly relevant when T is obtained by a stratified sampling, which naturally results in a set of strata. For example, in an example embodiment, T consists of strata $T_1, T_2, \ldots, T_7$. In this case, each stratum can be processed successively, as depicted in FIG. 32, which shows an alternative embodiment of FIG. 26.

This completes the explanation of step S3200 in FIG. 4. Before further describing the constrained subdivision of the spanning sample set, an explanation of the subdivision strategy will be given with reference to FIG. 6.

Figure 6:
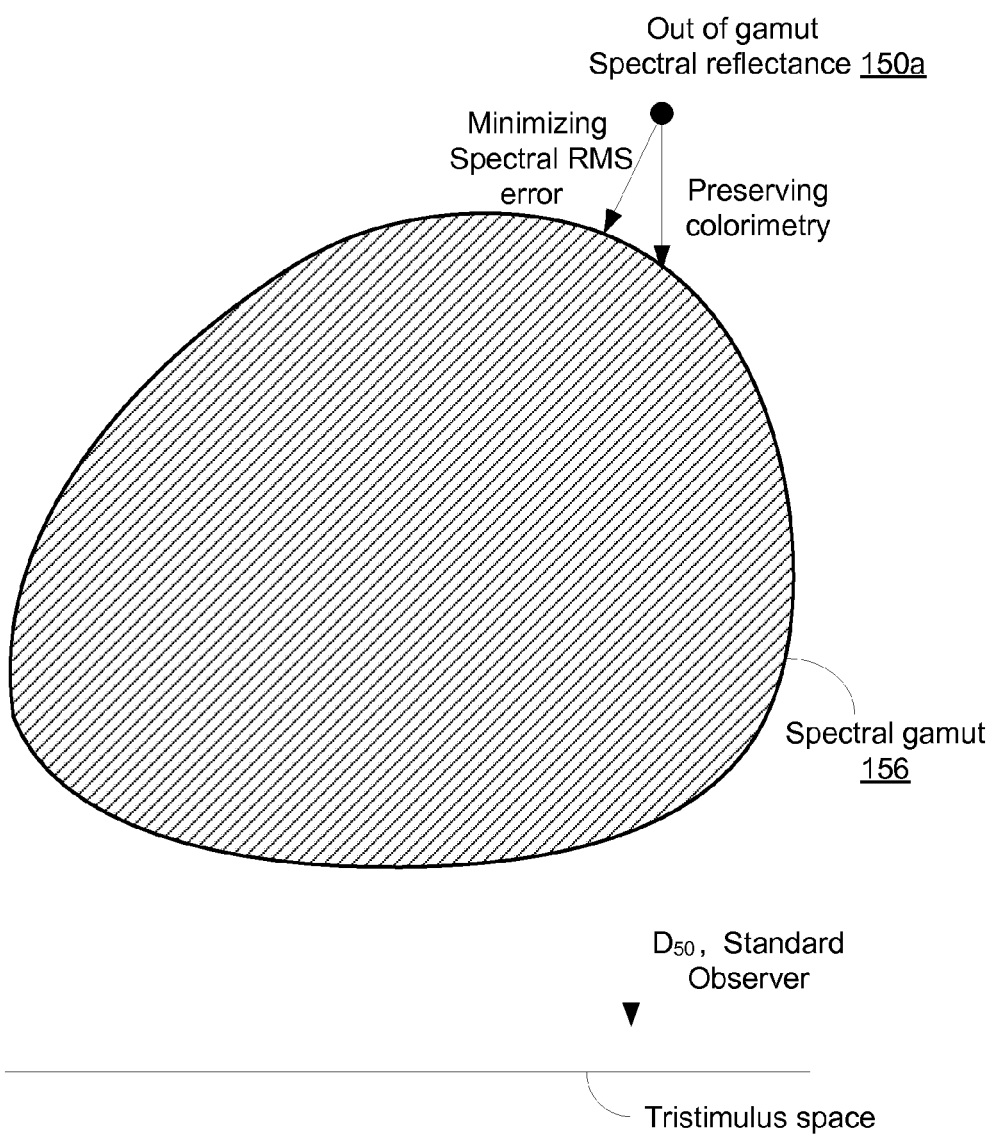
FIG. 6 is a diagram illustrating different spectral gamut mapping strategies.

FIG. 6 is a representative view of two different approaches to mapping out-of-gamut spectral reflectance 150a onto spectral gamut 156 of a device, such as printer 90. The first approach is a minimizing spectral root-mean-square (RMS) error approach. In this approach, the spectral RMS error can be proportional to the Euclidean distance in the spectral reflectance space. Using this first approach, it should be noted that the spectral RMS error does not necessarily correlate to visual error. In other words, a small spectral RMS error may correspond to a large delta-E, which is typically used to quantify the perceived error.

In a more sophisticated second approach, the spectral RMS error can be minimized subject to the constraint to preserve colorimetry corresponding to out-of-gamut spectral reflectance 150a under a certain reference illuminant, such as D50. Using this second approach, minimization can be seen to be constrained along fixed colorimetry.

Building on the idea of spectral gamut mapping constrained to fixed colorimetry, it is possible to subdivide samples that span spectral gamut 156 based on their colorimetry under a reference illuminant. Samples are classified into various subdivisions each of which has prescribed bounds in the colorimetric space and corresponds to small regions in the colorimetric space.

Returning to FIG. 4, in step S3300, a spectral reflectance array for each sample is generated by processing the device values corresponding to each sample through the forward spectral device model instantiated in step S2000 of FIG. 3.

In steps S3401 to S3403, a colorimetric LCh value is generated for each sample. In step S3401, each spectral reflectance array for each sample is converted to XYZ values under the reference illuminant chosen in step S3402. The reference illuminant can be chosen, for example, to be D50 or D65. Mathematically, an illuminant can be described by its spectral power distribution (SPD), written as $I(\lambda)$, where $\lambda$ represents the wavelength. In practice, an SPD can be represented as an array of intensities sampled at different wavelengths similar to spectral reflectance. However, since an SPD is generally non-smooth (e.g., has spikes), the sampling is typically done at smaller intervals (e.g., every 1 nm). For example, an SPD can be represented as a 301-dimensional vector, corresponding to sampling from 400 nm to 700 nm at 1 nm intervals. If $s(\lambda)$ is the spectral reflectance in question, then equations for conversion to XYZ value can be Equations 2 to 4 above.

The integration can be done by discrete summation at 1 nm intervals. The illuminant and the CIE "standard observer" functions $\bar{x}$, $\bar{y}$ and $\bar{z}$ are typically provided at 1 nm intervals, while the spectral reflectance $s(\lambda)$ can be re-sampled at 1 nm intervals (if it is originally sampled at 10 nm intervals), using typical interpolation techniques (e.g., linear interpolation).

In step S3403, the XYZ values are converted to LCh using the media white point. The media white point is the XYZ value of the color of the media. In the case of printer 90, this corresponds to no colorants and is the XYZ value of the paper white. Using the media white point is typically preferred to using the XYZ value of the reference illuminant in this conversion, because the resulting LCh gamut will typically have its "device neutral" axis aligned with a lightness axis. In particular, the media white point will typically correspond to an LCh of (100, 0, 0). Most conveniently, the media white point can be arranged to correspond to the first sample of the sample set S. If the media white point is represented as $X_0, Y_0, Z_0$, then Lab values, expressed in CIELab space as $L^*, a^*$ and $b^*$, can be calculated using Equations 5 to 8 above.

Further, LCh values, corresponding to the cylindrical coordinates for the Lab values, can be calculated as follows:

$$C^*_{ab} = \sqrt{a^{*2} + b^{*2}} \quad \text{(Equation 18)}$$

$$h_{ab} = \arctan(b^*/a^*) \quad \text{(Equation 19)}$$

with $L^*$ remaining the same as calculated above in Equation 5.

For convenience, the set of LCh values for the spanning samples will be denoted by $\hat{S}$.

Following step S3403, the set of samples are subdivided in step S3500 into subdivisions based on the LCh values of the samples. In subdividing the samples, the general strategy is to treat the following two cases separately: the near-neutral samples (the case of the neutral spine), and samples falling on a hue angle (the case of a hue leaf). In this regard, it should be noted that samples with small chroma may have a hue angle that is noisy. Thus, it is desirable to treat them as near neutral instead of classifying them by their hue angles. The process of subdividing samples within the neutral spine will be described in more detail in reference to FIG. 7, and the process of subdividing samples within the hue leaves will be described in more detail in reference to FIGS. 9 and 11.

Figure 7:
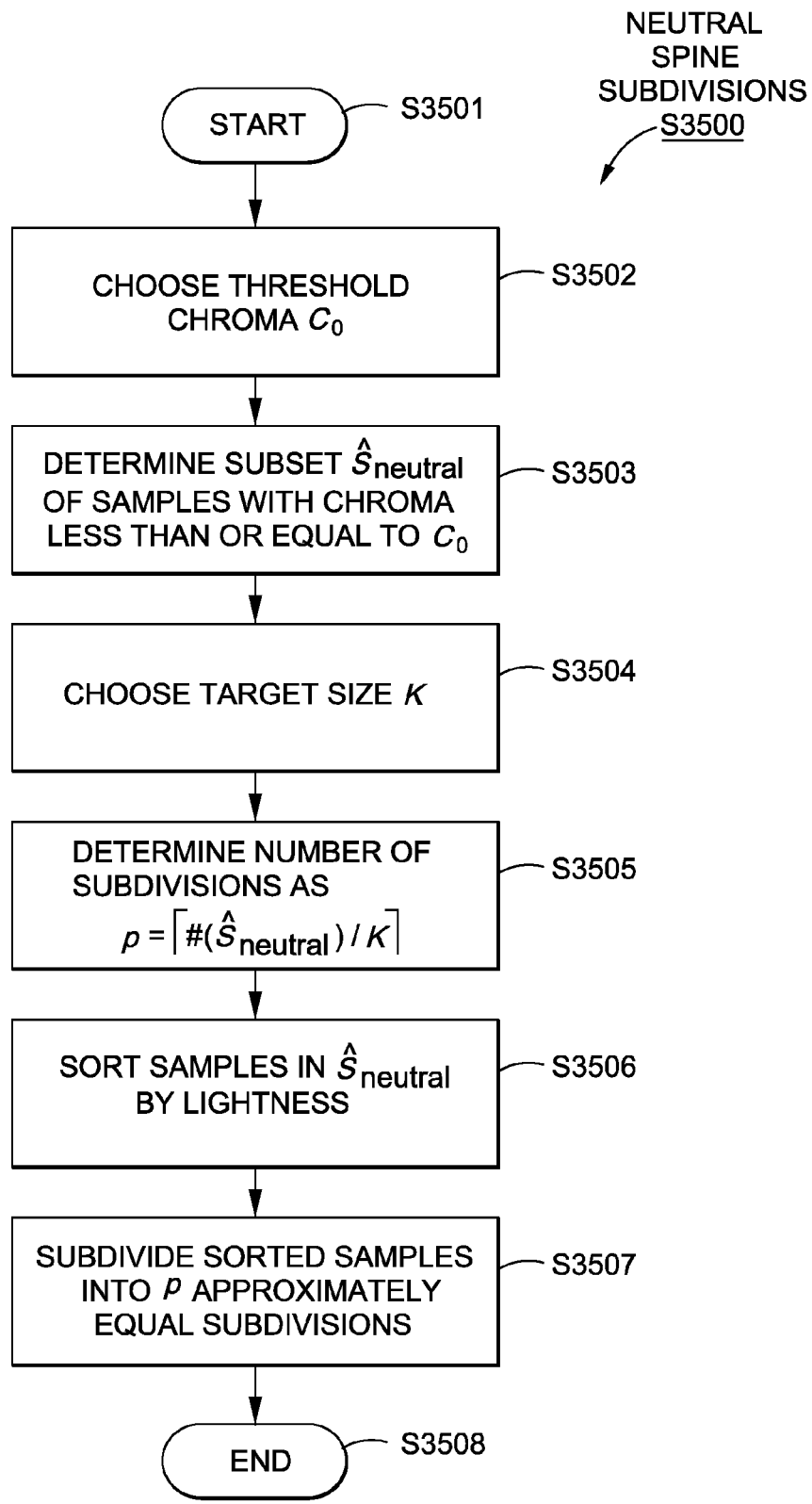
FIG. 7 is a flow diagram depicting the steps in the neutral spine subdivision according to an example embodiment.

FIG. 7 is a flow diagram illustrating the subdivision of samples within the neutral spine as described in step S3500 of FIG. 4. Briefly, a threshold chroma $C_0$ is chosen in step S3502. A subset of samples with a chroma less than or equal to $C_0$ is determined in step S3503. In step S3504, a target size K for the number of samples in each subdivision of the neutral spine is chosen. In particular, the number of samples in each subdivision of the neutral spine is limited by the predetermined number K. The number of subdivisions is determined in step S3505. The samples in the neutral spine are then sorted by lightness in step S3506 and the samples are then subdivided in step S3507.

In more detail, following step S3501, a threshold chroma $C_0$ such as $C_0 = 3$, is chosen as an upper bound for the chroma of samples in the neutral spine.

In step S3503, a subset $\hat{S}_{neutral}$ of $\hat{S}$, corresponding to samples having a chroma less than or equal to $C_0$ can be determined as follows:

$$\hat{S}_{neutral} = \{s \in \hat{S} | C^*_{ab}(s) \leq C_0\} \quad \text{(Equation 20)}$$

The notation $C^*_{ab}(s)$ denotes the chroma of the sample s in D50 LCh space. It is noted that as an implementation optimization, when referring to a sample s in $\hat{S}$, it is typical to refer to its index into $\hat{S}$. In an example implementation, specification of which sample is in which subdivision can be stored in storage space by storing the indices of the samples belonging to each subdivision, instead of storing the content of the samples. This can ordinarily save storage space as storing the indices typically requires less storage space than storing the content of the sample (LCh value in this case).

In step S3504, a target size for the number of samples in each subdivision of the neutral spine is chosen as K. $\hat{S}_{neutral}$ is subdivided such that the number of samples in each subdivision is approximately equal to K to ensure each subdivision is populated sufficiently. An example of a choice for K is K=300.

In step S3505, the number of subdivisions p is determined using K and the total number of samples in $\hat{S}_{neutral}$. For example, if the total number of samples in $\hat{S}_{neutral}$ is m, then the number of subdivisions for the neutral spine is p=⌈m/K⌉, where ⌈x⌉ is the ceiling operator that returns the smallest integer greater than or equal to the given number x.

Because the neutral spine is one-dimensional in lightness only, each subdivision can be specified by an upper bound and a lower bound in lightness.

In step S3506, the samples in $\hat{S}_{neutral}$ are sorted by lightness as a preliminary step in determining the upper and lower bounds of the subdivisions.

In step S3507, the upper and lower bounds of the subdivisions are obtained by subdividing the sorted samples in $\hat{S}_{neutral}$ into p subdivisions. In one example of subdividing the sorted samples, the upper and lower bounds, described in terms of the ordinal numbers of the sorted samples, are determined by:

$$1, \left[\frac{m-1}{p}\right]+1, \left[\frac{2(m-1)}{p}\right]+1, \quad \text{(Equation 21)}$$
$$\left[\frac{3(m-1)}{p}\right]+1, \ldots, \left[\frac{(p-1)(m-1)}{p}\right]+1, m$$

where [x] denotes a rounding operator that returns the closest integer to x. Furthermore, the samples in the p subdivisions can be described in terms of the ordinal numbers of the sorted samples, as follows:

$$\text{1st subdivision: } 1, 2, \ldots, \left[\frac{m-1}{p}\right] \quad \text{(Equation 22)}$$

$$\text{2nd subdivision: } \left[\frac{m-1}{p}\right]+1, \left[\frac{m-1}{p}\right]+2,$$
$$\ldots, \left[\frac{2(m-1)}{p}\right]$$

$$\text{3rd subdivision: } \left[\frac{2(m-1)}{p}\right]+1, \left[\frac{2(m-1)}{p}\right]+2,$$
$$\ldots, \left[\frac{3(m-1)}{p}\right]$$

$$\vdots$$

$$(p-1)\text{st subdivision: } \left[\frac{(p-2)(m-1)}{p}\right]+1,$$
$$\left[\frac{(p-2)(m-1)}{p}\right]+2, \ldots, \left[\frac{(p-1)(m-1)}{p}\right]$$

$$p\text{th subdivision: } \left[\frac{(p-1)(m-1)}{p}\right]+1,$$
$$\left[\frac{(p-1)(m-1)}{p}\right]+2, \ldots, m$$

The specification of the subdivision of the neutral spine is determined by recording the lightness bounds for each subdivision above, together with the indices of the samples belonging to each subdivision. It is noted that the indices to be recorded are indices to the sample set $\hat{S}$, or equivalently S, not the ordinal numbers in the sorted order.

After subdividing the sorted samples, the process of FIG. 7 then ends at step S3508.

Figure 8:
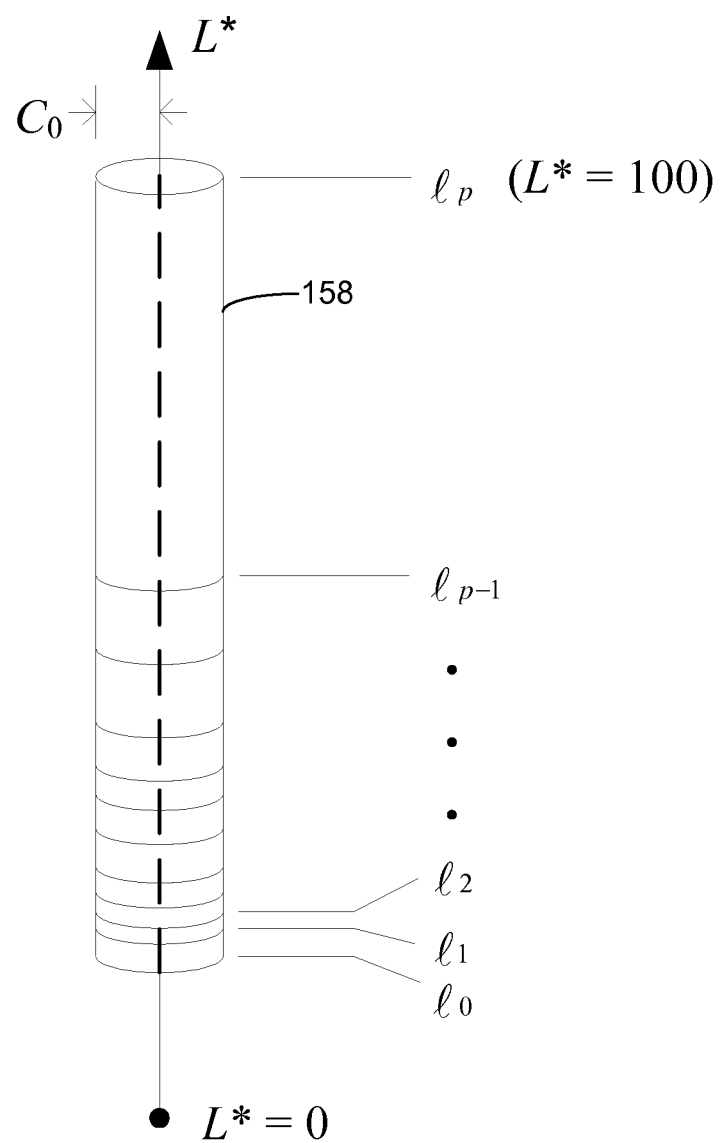
FIG. 8 is a diagram illustrating the neutral spine subdivision according to an example embodiment.

FIG. 8 is a representative view of subdivided neutral spine 158 resulting from the process of FIG. 7. In this example, each subdivision contains approximately K samples. As can be seen in FIG. 8, a set of ascending values in L*, $l_0 < l_1 < \ldots < l_p = 100$ are obtained, which correspond to the upper and lower bounds of each subdivision of neutral spine 158. While $l_p$ is generally equal to 100 because the choice of the white point for the LCh space, $l_0$ to is generally not zero, but rather corresponds to the black point of the device. In a different embodiment, where a different white point is used for the LCh space, a different value for $l_p$ other than 100 is possible.

The upper and lower bounds for each subdivision, together with the indices of the samples belonging to each subdivision, are saved to storage media in step S4000 of FIG. 3 to form a neutral spine part of the constrained subdivision, which in turn constitutes a part of gamut mapping data structures 146.

As noted above, in subdividing the set of samples, the near-neutral samples (i.e., the neutral spine) and the samples falling on a hue angle (i.e., a hue leaf) can be treated separately. In this regard, FIGS. 9 to 12 further describe subdividing the set of samples in hue leaves according to an example embodiment.

Figure 9:
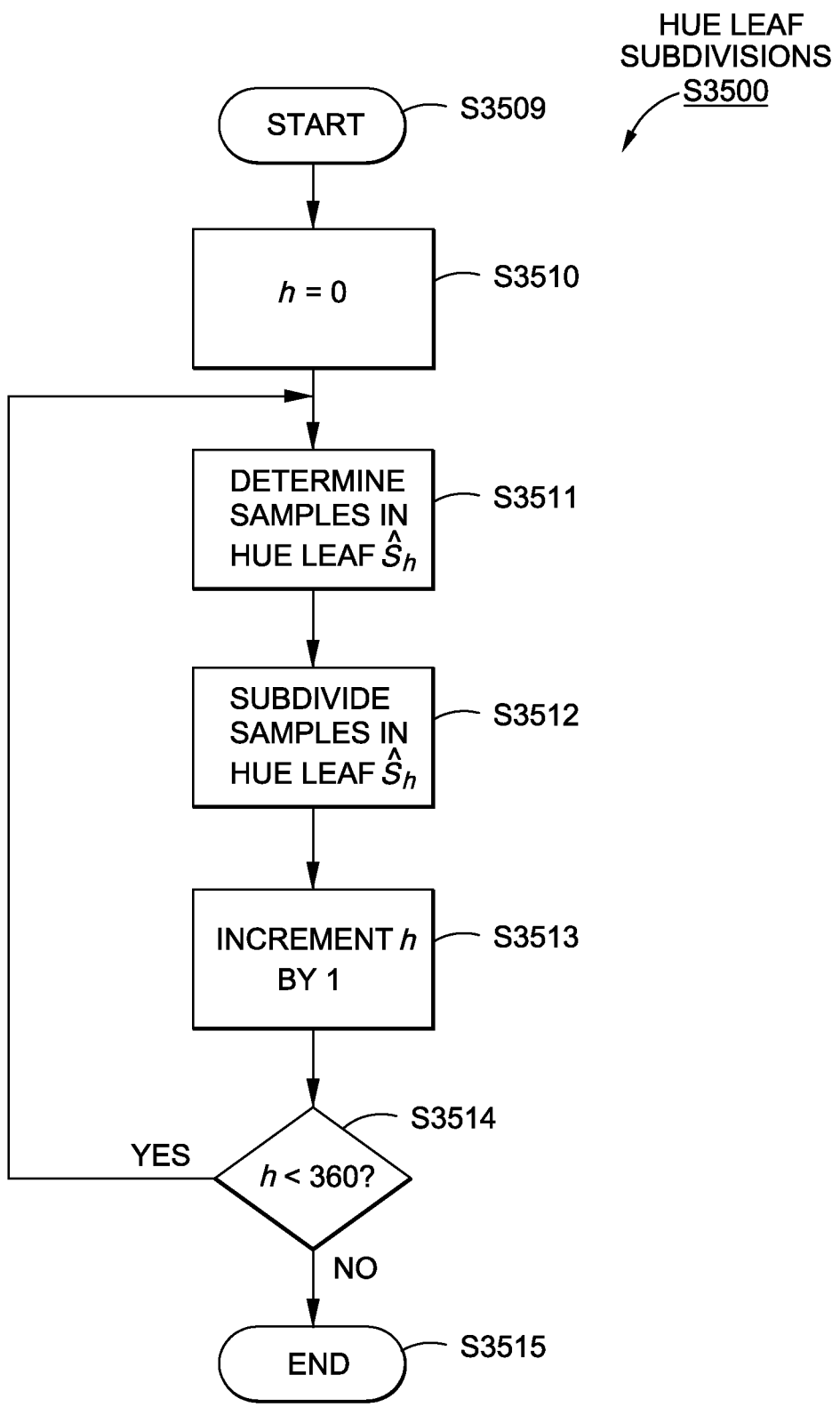
FIG. 9 is a flow diagram depicting the high level process steps of subdivision of hue leaves according to an example embodiment.

In the example of FIG. 9, 360 hue leaves are defined. Of course, a different number of hue leaves can be used. Briefly, following step S3509, a running integer h representing the hue is initialized to 0 in step S3510. The samples within a hue leaf corresponding to the hue integer h are determined in step S3511 and then the samples in this hue leaf are subdivided in step S3512. The hue integer h is then incremented by one in step S3513 and it is determined in step S3514 whether the hue integer h is less than 360. If the hue integer h is less than 360, the process returns to step S3511 to determine and subdivide samples in the next hue leaf. If the hue integer h is not less than 360, the process ends at step S3515.

In more detail, in step S3510, the initialization of the hue integer h to 0 corresponds to selecting a first hue leaf of zero hue angle.

In step S3511, the samples within the hue leaf corresponding to the integer h are determined. As shown in the example diagram of FIG. 10, for hue integers h=0, 1, 2, ..., 359, a subset $S_h$ of S is determined, and is defined as follows:

$$\hat{S}_h = \{s \in \hat{S} 1 | h_{ab}(s) - h | \leq 1\} \quad \text{(Equation 23)}$$

Figure 10:
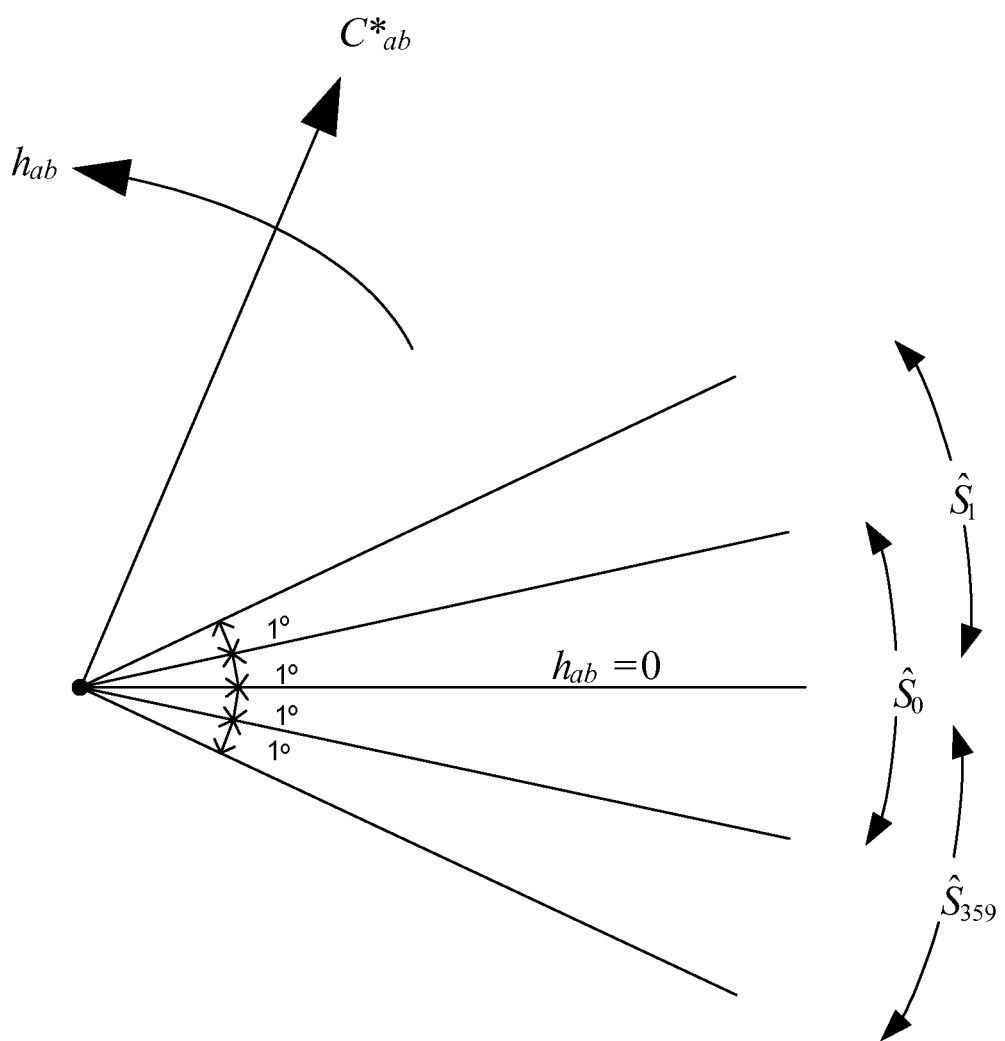
FIG. 10 is a diagram illustrating the span of hue angle for each hue leaf according to an example embodiment.

In other words, samples with a hue angle within 1 degree from hue integer h are included in a given hue leaf, as illustrated in FIG. 10. In Equation 23, the notation $h_{ab}$ (s) is used to denote the hue angle of a sample s in LCh space under the reference illuminant. The overlap between the hue leaves is deliberate and can smooth out the variation of the sample distribution as the hue is varied.

In step S3512, the samples in the hue leaf corresponding to the hue integer h are subdivided based on lightness and chroma.

In step S3513, the hue integer h is incremented so as to select the next hue leaf and in step S3514, it is determined whether the current hue integer h is less than 360. In other words, it is determined whether all hue leaves have been considered. If the current hue integer h is less than 360, the process returns to step S3511 to determine and subdivide samples in the next hue leaf. If hue integer h is not less than 360, the process ends at step S3515.

Figure 11:
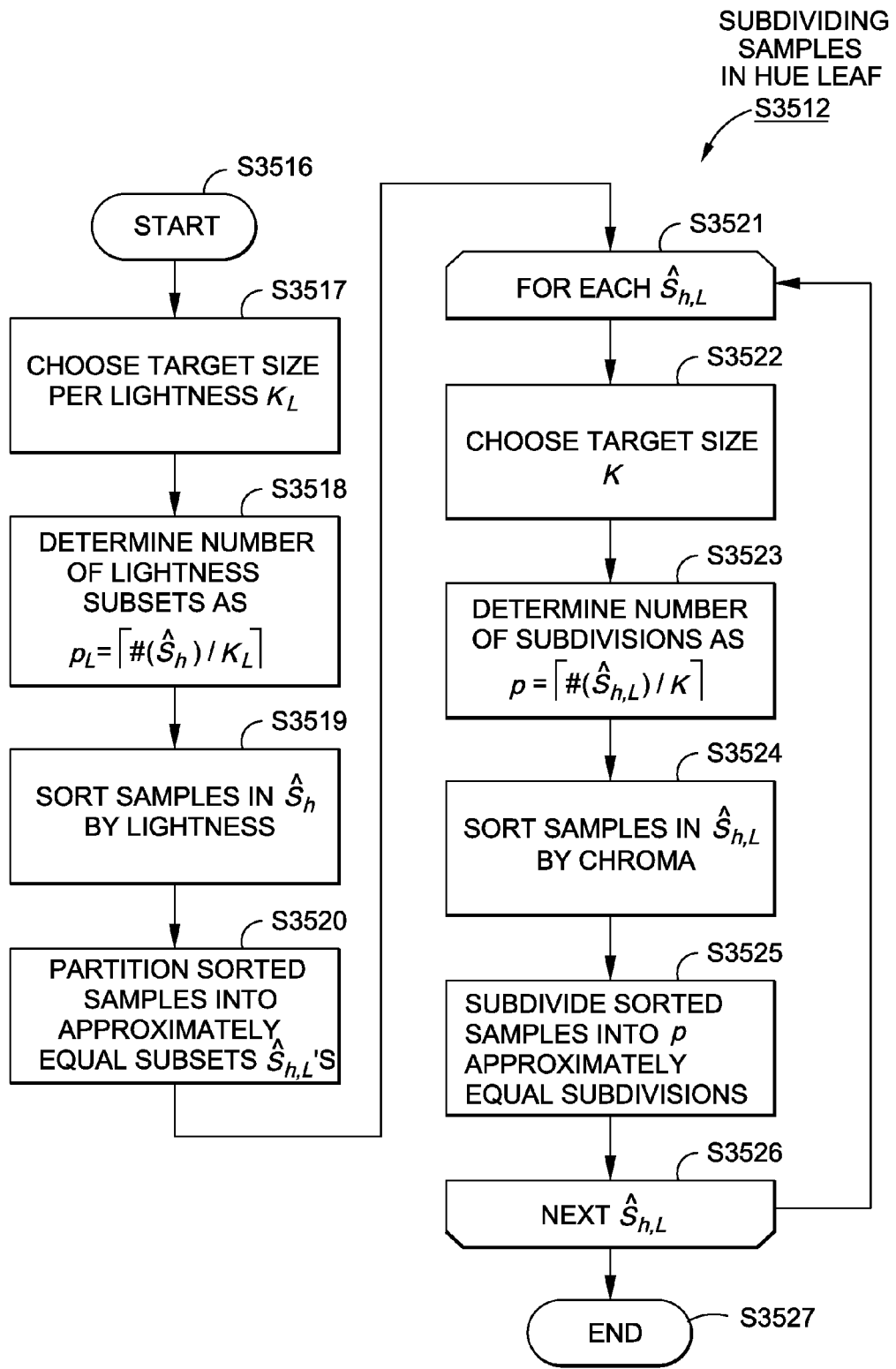
FIG. 11 is a flow diagram depicting the process steps for subdividing a hue leaf according to an example embodiment.

FIG. 11 is a flow diagram further illustrating the subdividing of samples in a hue leaf as performed in step S3512 of FIG. 9.

Briefly, following step S3516, for samples within a given hue leaf, $\hat{S}_h$, a target number of samples per lightness subset is chosen in step S3517. In step S3518, a total number of lightness subsets is determined for the given hue leaf. Samples in $\hat{S}_h$ are then sorted by lightness in step S3519 and then partitioned into approximately equal subsets $\hat{S}_{h,L}$'s in step S3520. Next, in the loop defined by S3521 and S3526, for each $\hat{S}_{h,L}$, a target number of samples per subdivision within each lightness subset is chosen in step S3522. In particular, the number of samples in each subdivision is limited by a predetermined number. In step S3523, the number of subdivisions p is determined and the samples in $\hat{S}_{h,L}$ are sorted by chroma in step S3524. The chroma sorted samples are subdivided into p approximately equal subdivisions in step S3525. The process ends at step S3527 after each $\hat{S}_{h,L}$ has been processed.

In more detail, in step S3517, for samples within a given a hue leaf, $\hat{S}_h$, a target number of samples per lightness subset is chosen as $K_L$, in step S3517. For example, $K_L$, may be chosen as 500 samples per lightness subset.

In step S3518, a total number of lightness subsets for the given hue leaf is determined as $$p_L = \lceil \#(\hat{S}_h)/K_L \rceil.$$

In other words, the total number of lightness subsets $p_L$, in a hue leaf is determined by applying the ceiling operator to the total number of samples in the hue leaf divided by $K_L$.

Figure 12A:
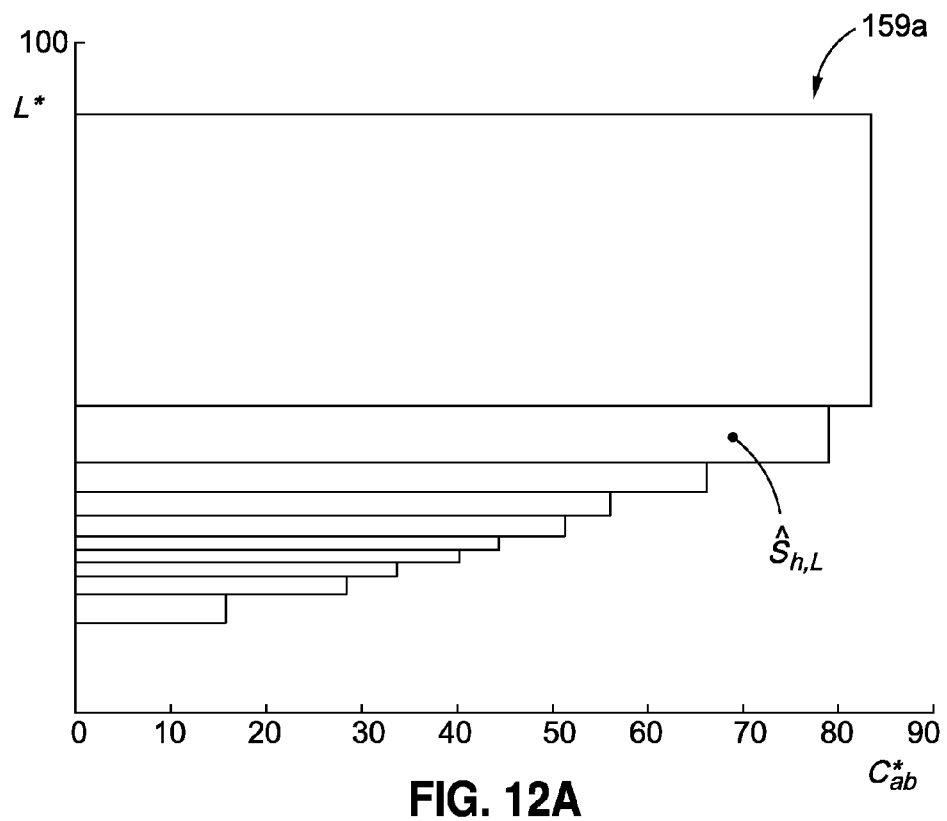
FIGS. 12A and 12B are diagrams illustrating the subdivision of hue leaves according to an example embodiment.

In step S3519, the samples in $\hat{S}_h$ are sorted by lightness in ascending order in lightness L*. In step S3520, the sorted samples in $\hat{S}_h$ are then partitioned into $p_L$, approximately equal lightness subsets $\hat{S}_{h,L}$'s in a similar manner as described for the subdivision of the neutral spine. Each lightness subset is bracketed by upper and lower bounds in lightness. In other words, the samples of $\hat{S}_h$ are partitioned into subsets of approximately equal numbers of samples of a target size (e.g., 500) based on the lightness of the samples within $\hat{S}_h$. FIG. 12A illustrates the subdivision at this point with hue leaf 159a partitioned based on the lightness of samples $\hat{S}_h$ to form ten lightness subsets such as $\hat{S}_{h,L}$.

Referring again to FIG. 11, in the loop defined by S3521 and S3526, for each $\hat{S}_{h,L}$, a target number of samples per subdivision within each lightness subset is chosen as K in step S3522. For example, K may be chosen as 100 samples per subdivision.

In step S3523, the total number of subdivisions for a given lightness subset $\hat{S}_{h,L}$, is determined as $$p = \lceil \#(\hat{S}_{h,L})/K \rceil$$

in a manner similar to determining the number of lightness subsets described above in reference to step S3518.

In step S3524, the samples in $\hat{S}_{h,L}$ are sorted by ascending chroma. In step S3525, the chroma sorted samples within $\hat{S}_{h,L}$ are subdivided into p subdivisions based on their chroma. Each subdivision is bracketed by upper and lower bounds in lightness L* and by upper and lower bounds in chroma $C^*_{ab}$.

Figure 12B:
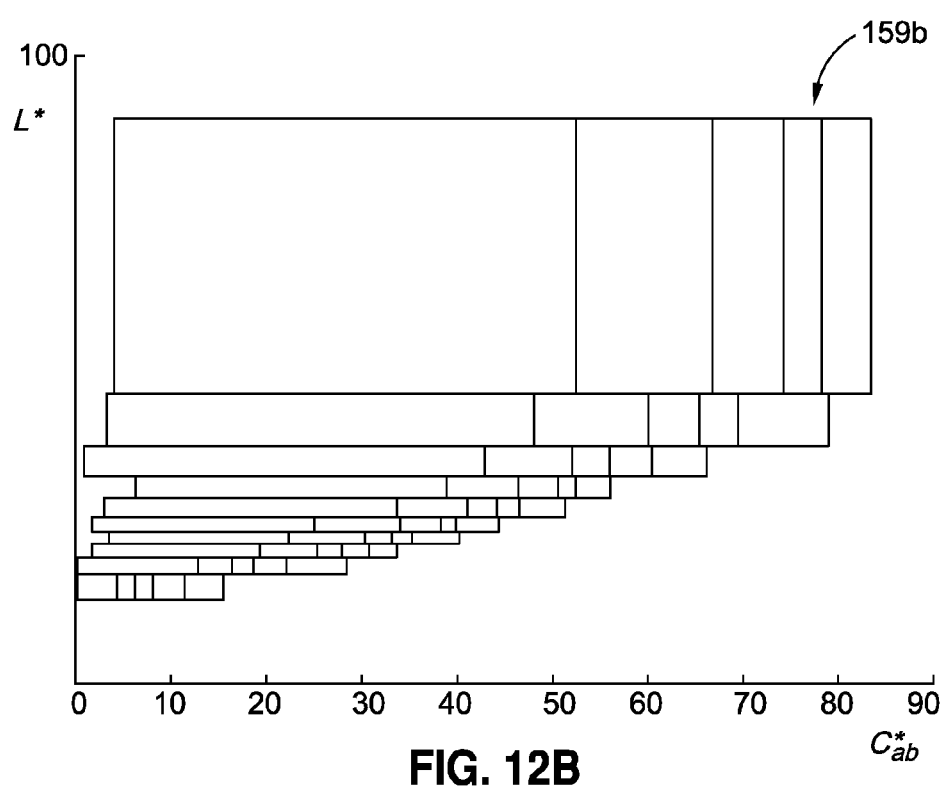

In the above example process, after step S3525 is performed on each of the lightness subsets $\hat{S}_{h,L}$, the samples in $\hat{S}_h$ have been subdivided into subdivisions of approximately 100 samples, with five subdivisions in a given lightness range. This is illustrated in FIG. 12B, which shows subdivided hue leaf 159b.

Figure 13:
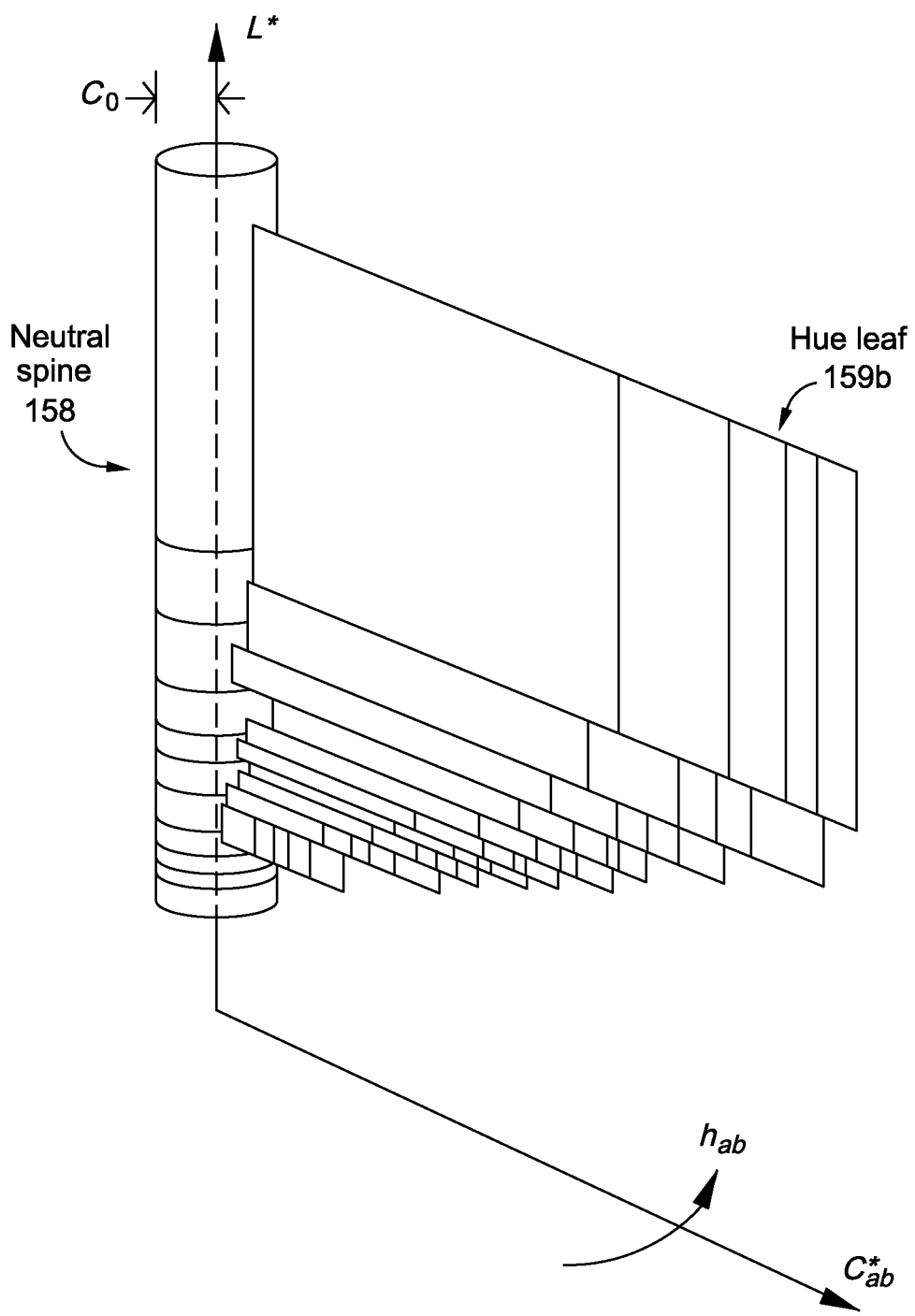
FIG. 13 is a representative view of the relationship between the neutral spine and the hue leaves according to an example embodiment.

Furthermore, FIG. 13 depicts the relationship between neutral spine 158 and hue leaf 159b according to the example embodiment described above.

Analogous to the neutral spine subdivisions, each hue leaf subdivision is saved to storage media in step S4000 of FIG. 3 which collectively form a hue leaves part of the constrained subdivision, which in turn constitutes a part of gamut mapping data structures 146. More specifically, for each hue leaf, the upper and lower bounds for each lightness subset, the upper and lower bounds for each subdivision within each lightness subset, together with the indices of samples belonging to each subdivision, are duly recorded.

This completes the description of step S3500 in FIG. 4, which is the last step of the computation of the constrained subdivision.

In reference to FIG. 4, step S3600 for generating the auxiliary computational data structure will now be explained. The auxiliary computational data structure is obtained by generating one or more colorimetric attributes for each sample in the set of samples S for calculating an objective function, wherein a colorimetric attribute includes a colorimetric value under an illuminant, a color inconstancy index from an illuminant to a reference illuminant, or a combination of multiple such colorimetric attributes. More specifically, as will be explained in later sections regarding the on-line phase, objective function 141 is used to search for a sample from the set of samples S that matches acceptably to an input color value. In order to compute objective function 141 for each sample efficiently, the auxiliary computational data structure is generated during the off-line phase and contains pre-computed quantities for use in the computation of objective function 141 during the on-line phase.

In more detail, the auxiliary computational data structure can be constructed to support multiple objective functions for the purpose of different applications or gamut mapping intent. Each application or gamut mapping intent corresponds to an embodiment of the objective function, which is now explained.

First Embodiment of the Objective Function

While a choice for objective function 141 might be the spectral root-mean-square (RMS) error, the RMS error does not correlate with visual error, as noted in reference to FIG. 6 above. Thus, a better choice for objective function 141 is an objective function that is based on delta-E. An embodiment of the objective function is the following:

$$\mathrm{Obj1}(r,s) = \max_{I \in \{D50, D65, A, F2, F7, F11\}} \Delta E(r,s,I) \quad \text{(Equation 24)}$$

Here, the notation $\Delta E(r, s, I)$ denotes the delta-E under illuminant I between the spectral reflectance array r corresponding to the input color value and the spectral reflectance array s corresponding to a sample in the spanning set. The delta-E equation chosen can be $\Delta E_{ab}$, $\Delta E_{94}$ or other delta-E equations.

The set of illuminants used can depend on the application. Illuminants D50, D65, A, F2, F7 and F11 are chosen above to represent a balanced set of illuminants. Illuminant D50 is a daylight illuminant, illuminant A is an incandescent illuminant, and illuminants F2, F7 and F11 are fluorescent illuminants with different characteristics in their spectral power distribution.

Using the objective function of Equation 24, the sample that minimizes the objective function would ordinarily have the smallest visual error under the set of chosen illuminants.

The value of $\Delta E(r,s,I)$ can be computed with the following procedure. First, XYZ values of the two spectral reflectance arrays under illuminant I can be calculated using Equations 2 to 4 provided above. The XYZ values for the two spectral reflectance arrays can be converted into Lab values using Equations 5 to 7, with $X_0$, $Y_0$ and $Z_0$ being the XYZ value for the white point of illuminant I. If the delta-E equation used is $\Delta E_{ab}$, the following equation can be used to calculate $\Delta E_{ab}$:

$$\Delta E_{ab}(r,s,I) = \sqrt{(L-L')^2 + (a-a') + (b-b')^2} \quad \text{(Equation 25)}$$

where L, a, and b denote the Lab value for the spectral reflectance array r, and L', a', and b' denote the Lab value for the spectral reflectance array s. It can be appreciated that $\Delta E_{ab}(r, s, I)$ is a function of the two Lab values under illuminant I.

If the delta-E equation used is $\Delta E_{94}$, the following set of equations can be used to calculate $\Delta E_{94}$:

$$\Delta L = L - L' \quad \text{(Equation 26)}$$

$$C = \sqrt{a^2 + b^2} \quad \text{(Equation 27)}$$

$$C' = \sqrt{a'^2 + b'^2} \quad \text{(Equation 28)}$$

$$\Delta C = C - C' \quad \text{(Equation 29)}$$

$$\Delta H = \sqrt{(a-a')^2 + (b-b')^2 - (\Delta C)^2} \quad \text{(Equation 30)}$$

$$\Delta E_{94}(r, s, I) = \sqrt{(\Delta L/k_L S_L)^2 + (\Delta C/k_C S_C)^2 + (\Delta H/k_H S_H)^2} \quad \text{(Equation 31)}$$

where $k_L = k_C = k_H = S_L = 1$, $S_C = 1 + 0.045C$, and $S_H = 1 + 0.015C$. It can be appreciated that $\Delta E_{94}(r, s, I)$ is a function of the two Lab values under illuminant I.

As shown above, the delta-E is based on the Lab values under the illuminant in question. Accordingly, pre-computing in the off-line phase Lab values under all the illuminants referenced in objective function 141 for the samples in the sample set S can ordinarily improve runtime performance in the on-line phase.

Second Embodiment of the Objective Function

A different gamut mapping intent other than a spectral match can be used. In particular, an objective function for minimal color inconstancy can be used for objective function 141, rather than an objective function for spectral match. One goal of using an objective function for spectral match, such as Equation 16 above, is to obtain a spectral match between an input spectral reflectance and a reproduction under an arbitrary illuminant. On the other hand, a goal of using an objective function for minimal color inconstancy is to have a reproduction that will retain the same color appearance under arbitrary illuminants as under a reference illuminant. In other words, when using an objective function for minimal color inconstancy, the gamut mapping attempts to choose among different possible samples such that the matching sample will look the same under arbitrary illuminants as under a reference illuminant, such as D50. In general, assume that a reference illuminant $I_0$, e.g. D50, has been chosen, and a set of N illuminants $I_1, I_2, \ldots, I_{N-1}$ (other than $I_0$) has also been chosen. An objective function for minimal color inconstancy can be defined as:

$$\text{Obj2}(s) = \max_{I \in \{I_1, I_2, \ldots, I_{N-1}\}} CII(s, I, I_0) \quad \text{(Equation 32)}$$

Here, s is a spectral reflectance coming from the sample set S, and CII (s, I, $I_0$) is a color inconstancy index of s under illuminant I. The color inconstancy index measures a predicted difference in color appearance of the spectral reflectance s as the illuminant changes from $I_0$ to I. The color inconstancy index can be calculated as follows. First, the CIEXYZ values of s under illuminants $I_0$ and I are calculated using Equations 2 to 4 above, respectively applied to $I_0$ and I to obtain corresponding CIEXYZ values ($X_0, Y_0, Z_0$) and (X, Y, Z).

Next, the CIEXYZ values of the white points of illuminants $I_0$ and I are determined. These values can be determined by the same Equations 2 to 4, but with $s(\lambda)=1$, which corresponds to the "perfect diffuser". The resulting CIEXYZ values of the white points can be denoted respectively by ($X_0^W$, $Y_0^W$, $Z_0^W$) and ($X^W$, $Y^W$, $Z^W$). These CIEXYZ values are converted to the CAT02 RGB space by the following equation:

$$\begin{pmatrix} R_0^W \\ G_0^W \\ B_0^W \end{pmatrix} = M_{CAT02} \begin{pmatrix} X_0^W \\ Y_0^W \\ Z_0^W \end{pmatrix} \quad \text{(Equation 33)}$$

$$\text{where } M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix}$$

There is a similar equation for ($X^W, Y^W, Z^W$) to convert to ($R^W, G^W, B^W$). The "corresponding" CIEXYZ value $X_C Y_C Z_C$ of the spectral reflectance s under the reference illuminant $I_0$ is determined by the following equation:

$$\begin{pmatrix} X_C \\ Y_C \\ Z_C \end{pmatrix} = M_{CAT02}^{-1} \begin{pmatrix} R_0^W/R^W & 0 & 0 \\ 0 & G_0^W/G^W & 0 \\ 0 & 0 & B_0^W/B^W \end{pmatrix} M_{CAT02} \begin{pmatrix} X \\ Y \\ Z \end{pmatrix} \quad \text{(Equation 34)}$$

Finally, CII(s, I, $I_0$) is determined to be the delta-E between ($X_0, Y_0, Z_0$) and ($X_C, Y_C, Z_C$) under illuminant $I_0$. As discussed above, the delta-E calculation can use any of the delta-E equations such as $\Delta E_{ab}$ or $\Delta E_{94}$ and involves converting the XYZ values to Lab values under the illuminant $I_0$ using Equations 5 to 7. It can be appreciated that CII (s, I, $I_0$) is dependent only on the sample s and not on the input color value at runtime during the on-line phase. Accordingly, Obj2 given by Equation 32 is also dependent only on the sample s and can be pre-computed during the off-line phase.

Returning to FIG. 4 and the description of step S3600, the computation of the auxiliary computational data structure may anticipate the objective function 141 used in the on-line phase and pre-compute as many colorimetric attributes as needed in order to support all the anticipated objective functions. In particular, an auxiliary computational data structure supporting Obj1 given by Equation 24 and Obj2 given by Equation 32 is illustrated in FIG. 14. It is noted that Obj2 can be completely pre-computed during the off-line phase. For Obj1, it can be seen from Equation 24 that the delta-E under each illuminant in the predetermined set of illuminants is required. As discussed before, each delta-E is dependent only on the Lab value of the input color value and the Lab value of the sample in the sample set S. With the Lab values of all the samples in S pre-computed during the off-line phase, only the Lab value of the input color value under each illuminant needs to be computed at runtime during the on-line phase. Thus, it is ordinarily possible to improve runtime performance using the auxiliary computational data structure.

It can be appreciated that the layout of the structure in FIG. 14 is only exemplary. Other structures can be constructed during the off-line phase to support different illuminants and/or different objective functions.

It can further be appreciated that the inclusion of the auxiliary computational data structure in the off-line phase is not mandatory. Without the auxiliary computational data structure available during the on-line phase, the objective function result corresponding to each sample can still be computed directly from the spectral reflectance of each sample, at the cost of a hit in runtime performance.

This completes the description of step S3600 in FIG. 4 and also the description of the example embodiment of the off-line phase.

Embodiments of the On-Line Phase

Returning to FIG. 3, in step S6000, spectral gamut mapping is performed by spectral gamut mapping module 142. At its highest level, spectral gamut mapping module 142 accepts input color value 150 and outputs output color value 155.

Depending on the embodiment of objective function 141, input color value 150 may take on different meaning. If objective function 141 is Obj1 given by Equation 24 above, input color value 150 can be a spectral reflectance array. A spectral reflectance array may comprise 31 dimensions of spectral reflectance data that represent reflectance at every 10 nm interval in the visible wavelength spectrum from 400 nm to 700 nm. If objective function 141 is Obj2 given by Equation 32 above, input color value 150 can be an XYZ value under a reference illuminant such as D50. Input color value 150 can correspond to a pixel of an input image obtained from network interface 109, DVD interface 119, or an interface to a source device, such as digital camera interface 126. Alternatively, the input image can also be obtained by CMM 135 from image files 148. Additionally, an input image can come from a capture device in the traditional sense, such as camera 60 or scanner 70, or from "color sets", such as from a reflective target (e.g., a Digital ColorChecker SG).

In various embodiments, S6000 outputs output color value 155 which can be an output device value, a spectral reflectance array corresponding to the output device value, or a monitor RGB value that simulates the appearance of the output device on a monitor. In the case where the output device is printer 90, output color value 155 can be an output device value for printer 90. In the case where the output device is a monitor that is used to simulate the output of printer 90 (for example), output color value 155 can be a monitor RGB value. In yet another case where a reflectance image is preferred, such as for archiving, output color value 155 can be a spectral reflectance array.

One goal of spectral gamut mapping is to map an input color value so that an output color value is within a spectral gamut of the output device. In a strict sense used by some researchers, spectral gamut mapping takes device independent colors and outputs device independent colors. Such a definition is especially prevalent in conventional gamut mapping in a color appearance space, which is device independent. For practical purposes, however, the result of gamut mapping has to be "materialized" by an output device. In other words, the result of gamut mapping has to be converted to device values. Conventionally, this step is achieved by invoking the "inverse device model" of the output device. In the following embodiments, "spectral gamut mapping" can include the final result of producing device values, and as discussed in more detail below, spectral gamut mapping module 142 can ordinarily avoid invoking an inverse spectral device model, which can be a very expensive computation.

Figure 15:
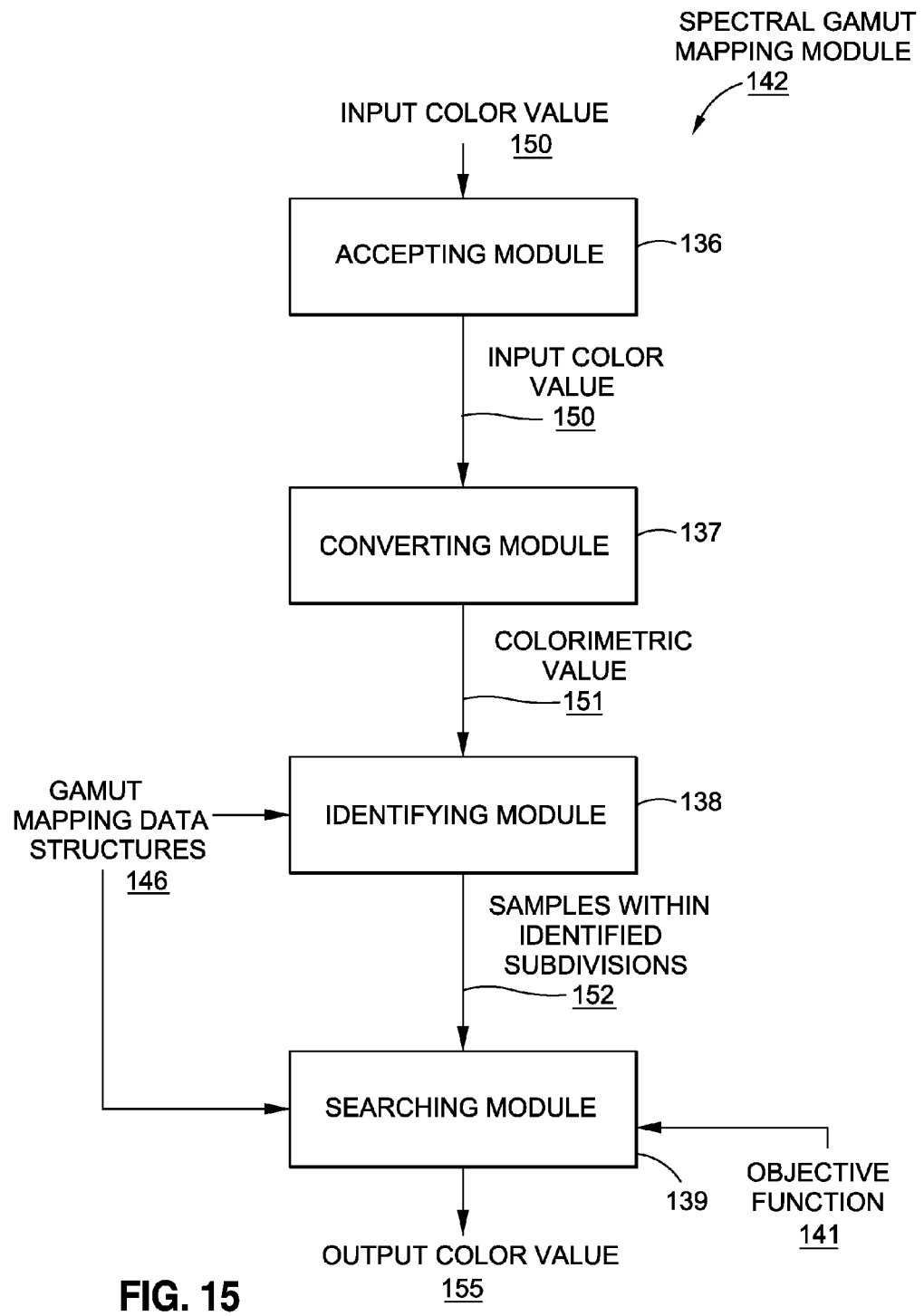
FIG. 15 is a flow diagram depicting process steps of the on-line phase according to an example embodiment.

FIG. 15 is a diagram illustrating the general steps in the spectral gamut mapping step S6000 of FIG. 3.

Briefly, accepting module 136 accepts input color value 150 and converting module 137 converts input color value 150 into a colorimetric value under the same reference illuminant used during the off-line phase. The converted colorimetric value includes a lightness in the lightness dimension, a chroma in the chroma dimension and a hue in the hue dimension. Identifying module 138 identifies subdivisions from the constrained subdivision structure of gamut mapping data structures 146 which fall within a tolerance of the converted colorimetric value using the lightness, chroma and hue of the converted colorimetric value. The samples within the identified subdivisions are searched by searching module 139 using the auxiliary computational data structure of gamut mapping data structures 146 and/or objective function 141 so as to find a sample that matches acceptably to input color value 150 relative to objective function 141. In addition, searching module 139 may optionally use the forward spectral device model instantiated in step S5000 depending on the embodiment of the searching module.

In more detail, when a user of host computer 41 chooses to print an image at printer 90, for example, accepting module 136 accepts a color value for each pixel of the input image. A single color value is accepted by accepting module 136 as input color value 150. Input color value 150 is a spectral reflectance array if the input image is a spectral image (such as from a calibrated multispectral camera), which corresponds to objective function 141 being Obj1 given by Equation 24. Input color value 150 is a colorimetric value under a reference illuminant if the input image is a colorimetric image (or equivalently, a calibrated RGB image), which corresponds to objective function 141 being Obj2 given by Equation 32.

Converting module 137 converts input color value 150 to colorimetric value 151 under a reference illuminant, such as D50. Converting module 137 can perform different steps depending on input color value 150. If input color value 150 is a spectral reflectance array, converting module 137 performs steps similar to the generation of colorimetric values in the off-line phase by using Equations 2 to 8, 18 and 19, as provided above. If the input color value 150 is a colorimetric value under the reference illuminant, such as an XYZ value, converting module 137 performs steps using Equations 5 to 8, 18 and 19, as provided above.

In addition, an optional colorimetric gamut mapping can be performed by converting module 137. If this optional gamut mapping is performed, then colorimetric value 151, i.e., LCh value, may be altered from the result of the conversion discussed above.

For example, if colorimetric value 151 is outside the colorimetric gamut under the reference illuminant, converting module 137 may apply a colorimetric gamut mapping to bring colorimetric value 151 to within the colorimetric gamut of the output device.

Figure 16:
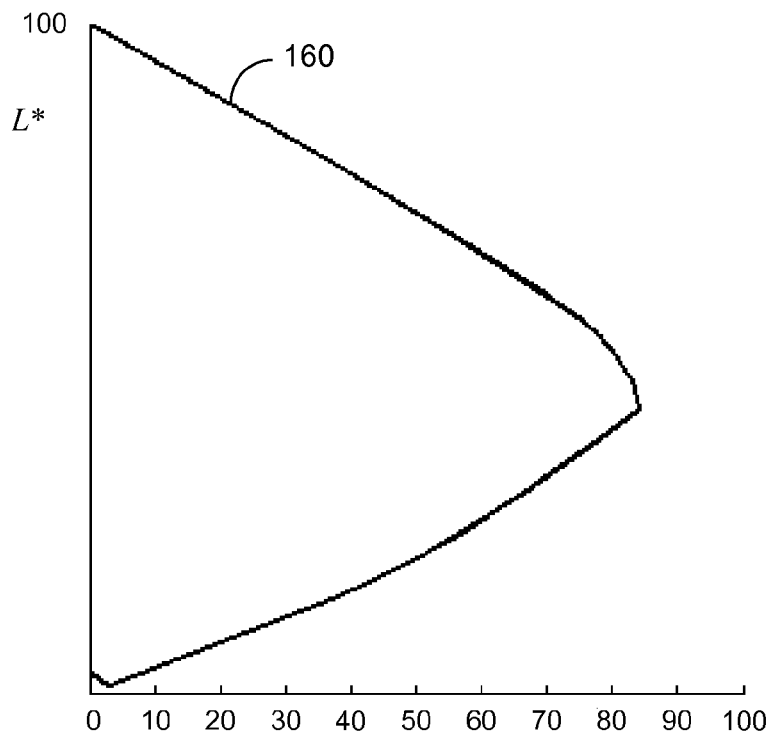
FIG. 16 is a diagram illustrating the geometric boundary of a hue leaf.

Many different types of colorimetric gamut mapping methods can be used. One type of colorimetric gamut mapping includes hue-preserving methods. Such hue-preserving methods use a geometric boundary of a hue leaf that can conveniently be determined using the samples of the constrained subdivisions as described herein. More specifically, for a given hue integer h, a subset of samples, denoted $\hat{S}_h$, pertaining to this hue has been described above in reference to FIG. 9. However, due to the erratic change in hue for near-neutral colors, the samples in this hue leaf may not cover the region near the neutral axis sufficiently. This is apparent in FIG. 12B, which shows that a given subdivided hue leaf does not completely cover the neutral axis. To remedy this, the samples of the neutral spine in $\hat{S}_{neutral}$ are included in the determination of the geometric boundary of the hue leaf. In other words, all the samples in $\hat{S}_h \cup \hat{S}_{neutral}$ are used in the construction of the geometric boundary of the hue leaf. For example, the hue components of these samples are first discarded (so that the samples now lie in a two-dimensional L*C*$_{ab}$ plane) either if the hue components are within one degree from h, or if the samples are near-neutrals. A convex hull construction can then be performed in the two-dimensional plane using the lightness and chroma of the samples to determine the geometric boundary of the hue leaf. An example of a resulting hue leaf boundary is shown as geometric boundary 160 in FIG. 16.

Figure 17A:
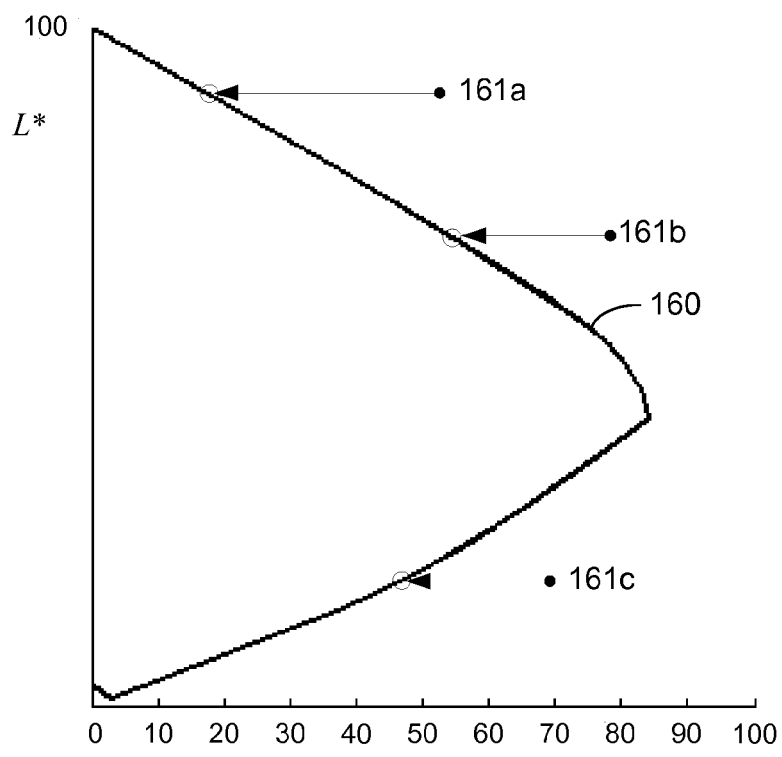
FIG. 17A illustrates examples of constant lightness clipping onto a hue leaf boundary.
Figure 17B:
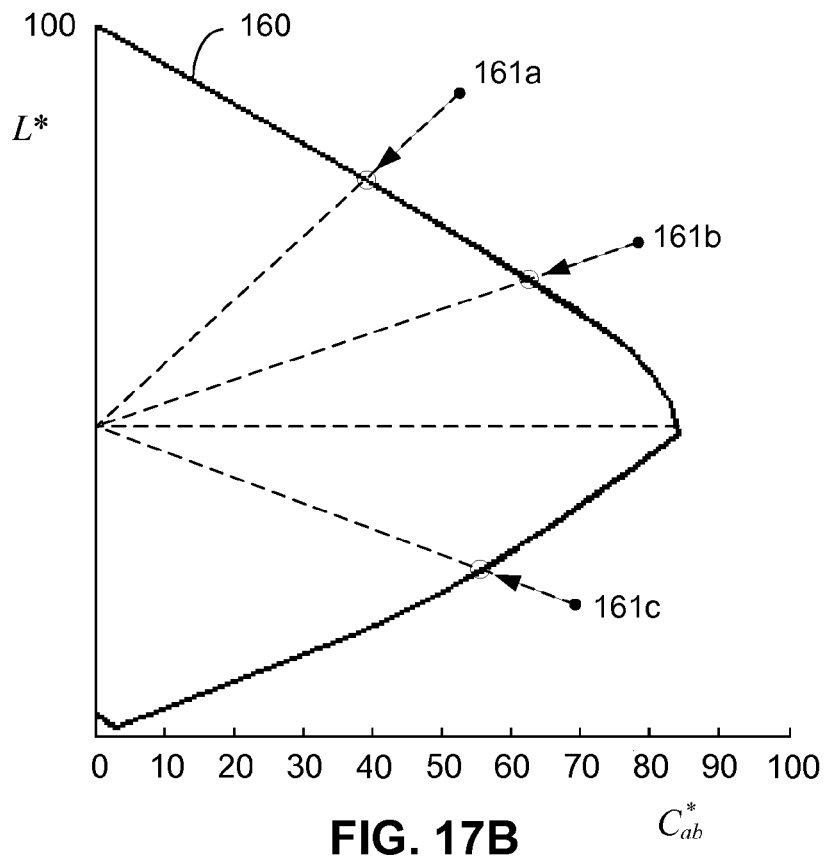
FIGS. 17B and 17C illustrate examples of gamut mapping strategies for optional colorimetric gamut mapping onto a hue leaf boundary.
Figure 17C:
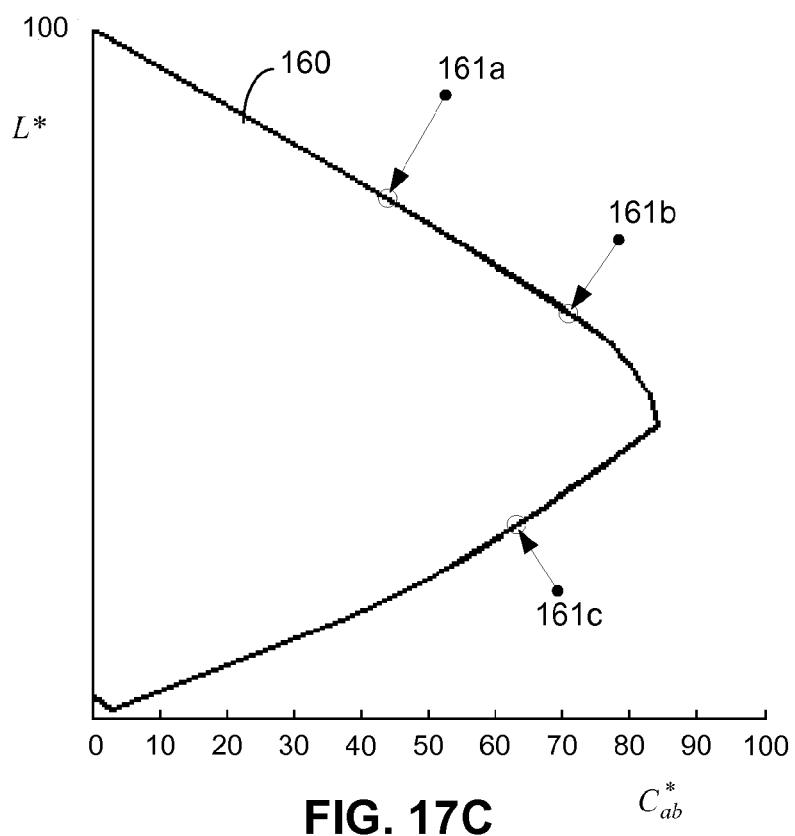

With a geometric representation of the boundary of the hue leaf, various gamut mapping methods can then be implemented. For example, as shown in FIG. 17B, out-of-gamut colors 161*a*, 161*b* and 161*c* are clipped towards the lightness on the neutral axis corresponding to the cusp. Another strategy is to clip to the closest point on the boundary, as shown in FIG. 17C. For comparison, if the optional colorimetric gamut mapping is not applied, the equivalent result of identifying module 138 will be a constant lightness mapping, as shown in FIG. 17A.

Referring again to FIG. 15, whether an optional colorimetric gamut mapping has been applied or not by converting module 137, colorimetric value 151 will be passed on to identifying module 138. Identifying module 138 then identifies subdivisions of samples within the spectral gamut of printer 90 by using the constrained subdivision structure of gamut mapping data structures 146. In more detail, the constrained subdivision structure can include upper and lower bounds for the subdivisions and indices for the samples included within the subdivisions. Samples within identified subdivisions 152, in the form of indices to the samples in sample set S, are then provided to searching module 139.

Figure 18:
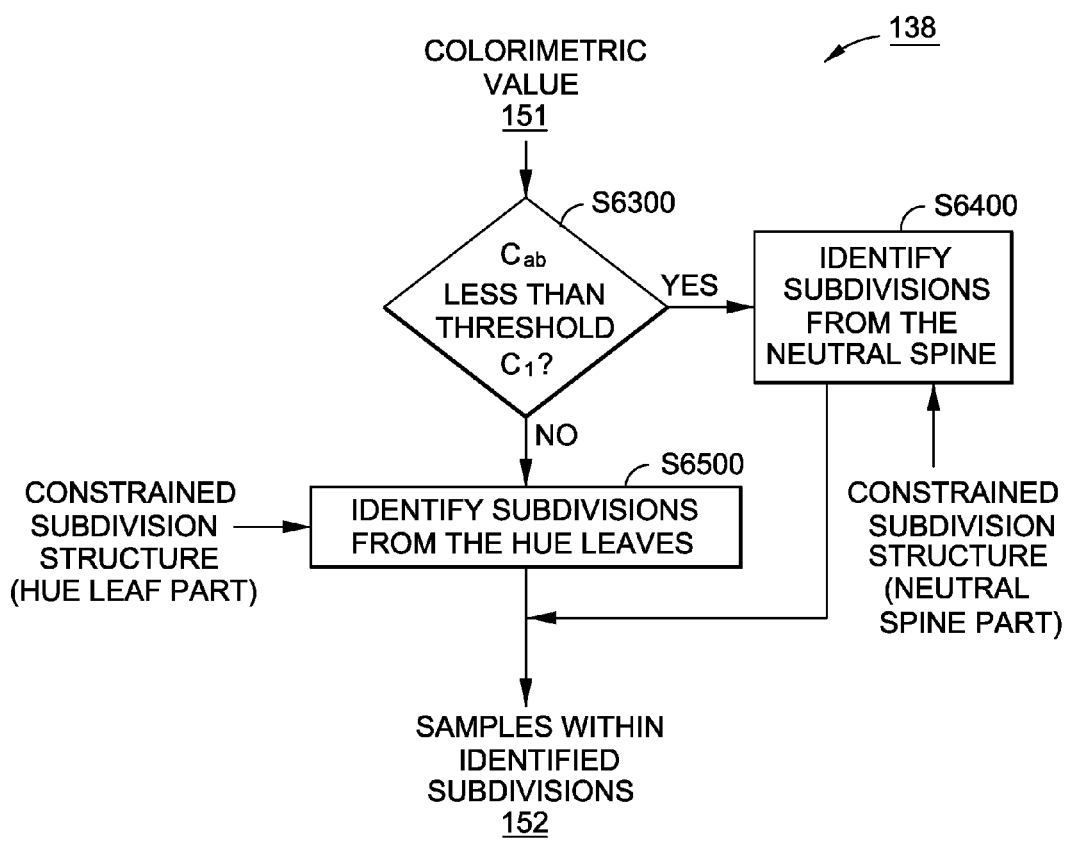
FIG. 18 is a flow diagram depicting the process steps in the identifying module in the on-line phase according to an example embodiment.

FIG. 18 provides a more detailed view of the steps performed by identifying module 138 in FIG. 15. In step S6300, identifying module 138 determines whether the chroma $C_{ab}$ of converted colorimetric value 151 is less than a threshold chroma $C_1$. This threshold is related to the threshold chroma $C_0$ used in the definition of the neutral spine during the off-line phase, but threshold chromas $C_0$ and $C_1$ do not need to be the same. In fact, the choice of $C_0$ is generally larger to ensure some overlapping with the hue leaves, as the intention of the neutral spine and the hue leaves is to "cover" the whole colorimetric gamut of the output device. In addition, some overlapping of subdivisions will ordinarily help to ensure smoother transitioning of the sample distribution between the hue leaves, and also between the neutral spine and the hue leaves.

In one embodiment, the choice of $C_1$ is determined based on a consideration of whether LCh values with chroma smaller $C_1$ would have a noisy hue angle. In other words, LCh values with a chroma less than $C_1$ would have so much noise in the hue angle so as to make the hue angle statistically unreliable. Generally, $C_1 < C_0$. For example, if $C_0 = 3$, then $C_1 = 2$ may be used.

In step S6300, if the chroma $C_{ab}$ of converted colorimetric value 151 is less than threshold chroma $C_1$, then the process proceeds to step S6400 to identify subdivisions from the neutral spine. In more detail, subdivisions from the neutral spine are identified that fall within a tolerance δ of the lightness of converted colorimetric value 151.

Figure 19:
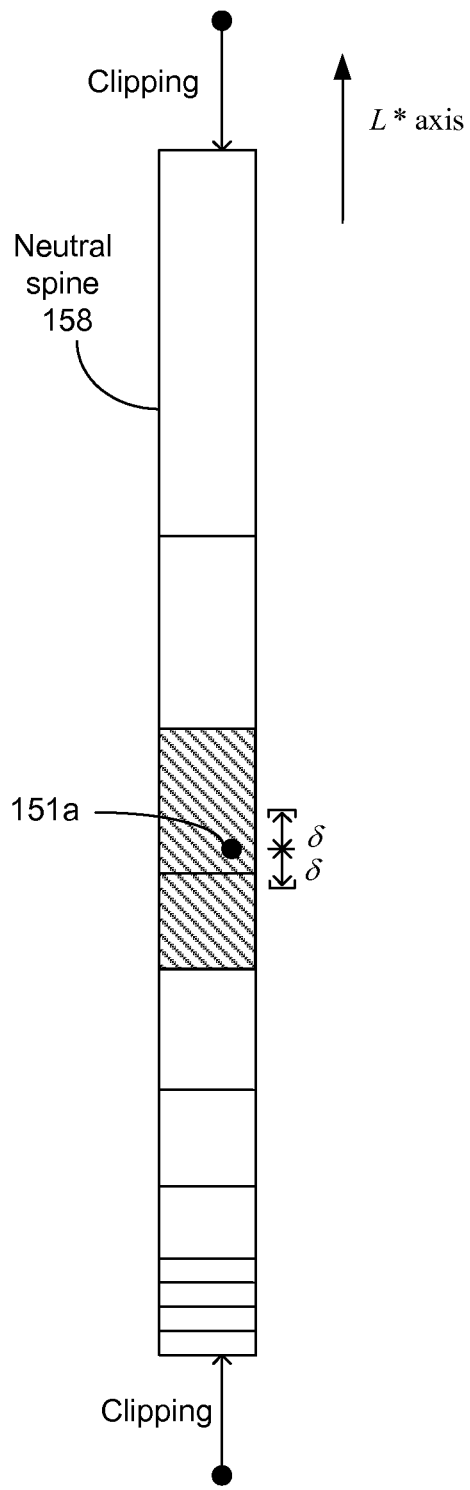
FIG. 19 is a representational view of identifying subdivisions in a neutral spine according to an example embodiment.

FIG. 19 is a representational view of identifying subdivisions in a neutral spine. As shown in FIG. 19, a clipping in the lightness dimension may first need to be performed if the lightness of colorimetric value 151 is not within the range between the minimum and maximum lightness of the neutral spine. This is necessary if colorimetric value 151 is outside the colorimetric gamut and optional colorimetric gamut mapping has not been performed by converting module 137 as described above. For comparison to the optional colorimetric gamut mapping methods discussed above, FIG. 17A illustrates the clipping of colors 161*a*, 161*b* and 161*c* along constant lightness when no optional colorimetric gamut mapping is applied.

In step S6400 of FIG. 18, an interval [L*−δ, L*+δ] is determined, where L* is the lightness of colorimetric value 151 (which may have been clipped if an optional colorimetric gamut mapping has been applied), and δ is a chosen tolerance related to a visual threshold. For example, δ=1 can be chosen based on the "just noticeable difference" (JND) of human vision. The covering subdivisions from the neutral spine that intersect this interval are then identified by comparing the interval with the upper and lower bounds stored in the neutral spine subdivision structure of the constrained subdivision structure. This identification is represented in FIG. 19, where the shaded region contains the identified subdivisions that are within a tolerance δ of the converted colorimetric value 151*a*.

If in step S6300, the chroma $C_{ab}$ of converted colorimetric value 151 is not less than threshold chroma $C_1$, then the process of FIG. 18 proceeds to step S6500 to identify subdivisions from the hue leaves.

In step S6500, the nearest integer hue corresponding to the hue of colorimetric value 151 is determined. Data for the subdivisions from the hue leaf corresponding to the integer are then retrieved from the hue leaf subdivision structure of the constrained subdivision structure. As a preliminary step, a clipping can be performed to make sure colorimetric value 151 lies within the hue leaf. More specifically, a clipping can be performed to make sure the lightness of colorimetric value 151 is within the range between the minimum and maximum lightness of the hue leaf. In addition, a clipping may also be performed to make sure the chroma of colorimetric value 151 is within the range between the minimum and maximum chroma of the hue leaf in the corresponding lightness range. Such preliminary clipping is ordinarily not performed if optional colorimetric gamut mapping is performed by converting module 137, as described above.

Figure 20:
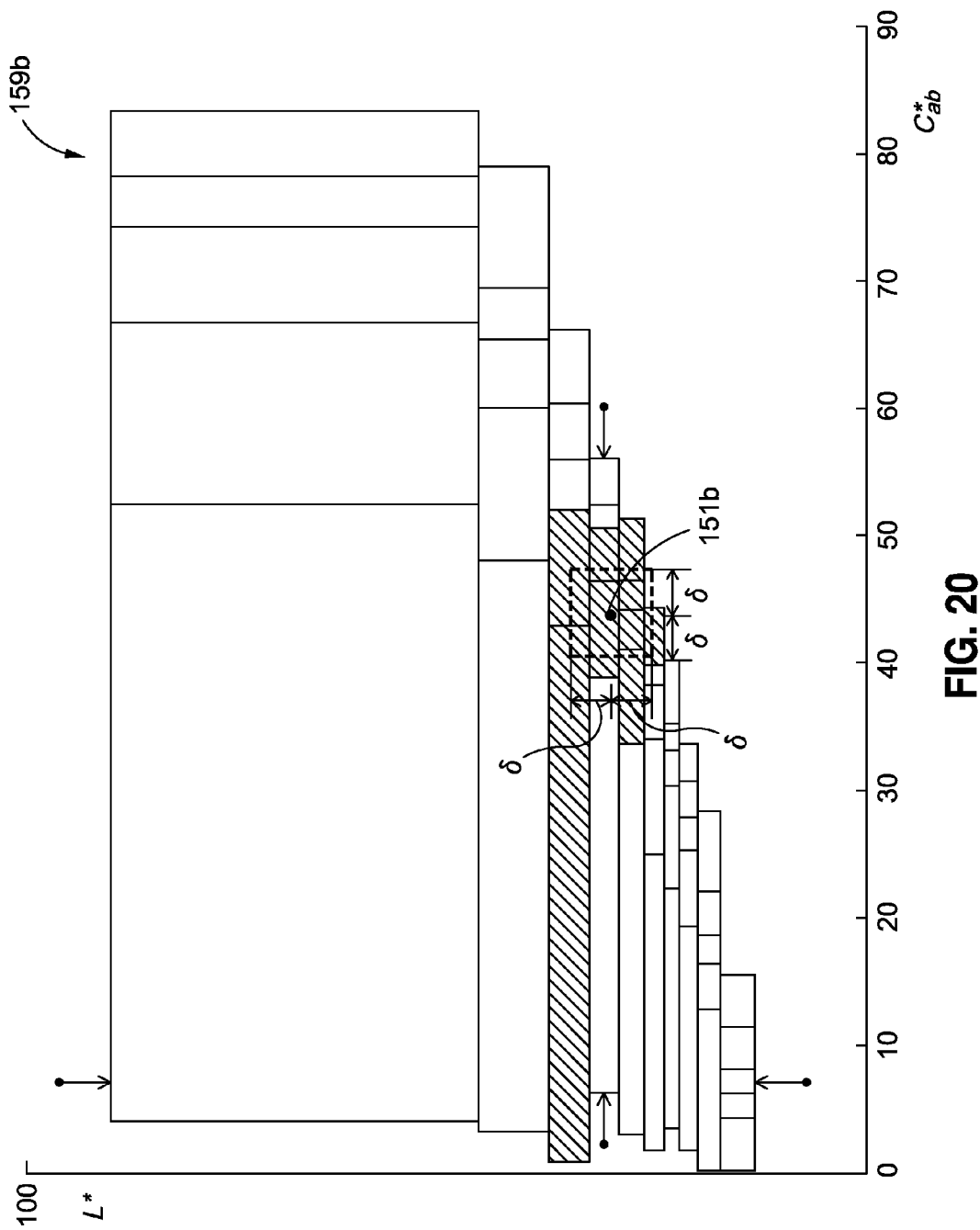
FIG. 20 is a representational view of identifying subdivisions in a hue leaf according to an example embodiment.

A box defined by lightness range [L*−δ, L*+δ] and chroma range [$C_{ab}$*−δ, $C_{ab}$*+δ] is then determined, where L* and C*$_{ab}$ are the lightness and chroma, respectively, of colorimetric value 151. As in step S6400, δ is a chosen tolerance related to acceptable visual threshold. For example, δ=1 can be chosen based on the "just noticeable difference" (JND) of human vision. The covering subdivisions from the hue leaf that intersect this box are then determined by comparing the lightness and chroma ranges with the upper and lower bounds for lightness and chroma for subdivisions from the retrieved hue leaf subdivision structure. This is graphically represented in FIG. 20, where the shaded region contains the identified subdivisions of hue leaf 159*b* that fall within tolerance δ of converted colorimetric value 151*b*. In one example embodiment, the number of samples in the identified subdivisions ranges from approximately 100 to 2,000 samples, depending upon colorimetric value 151.

Referring to FIG. 15 again, various embodiments of searching module 139 are possible and will be described in the following. Briefly, searching module 139 searches samples within identified subdivisions 152 so as to find a sample that matches acceptably to the input color value relative to an objective function. In one embodiment, the result of the search is provided in the form of an "optimal sample index". Searching module 139 then looks up an output device value, spectral reflectance array or monitor RGB value that corresponds to the optimal sample index. It is noted that the look up procedure has a low computational cost because the tables of device values, spectral reflectance arrays or monitor RGB values can be pre-computed for the sample set S. In this manner, searching module 139 ordinarily avoids having to apply an inverse spectral device model, which can be a very computationally expensive procedure.

First Embodiment of the Searching Module

Figure 21:
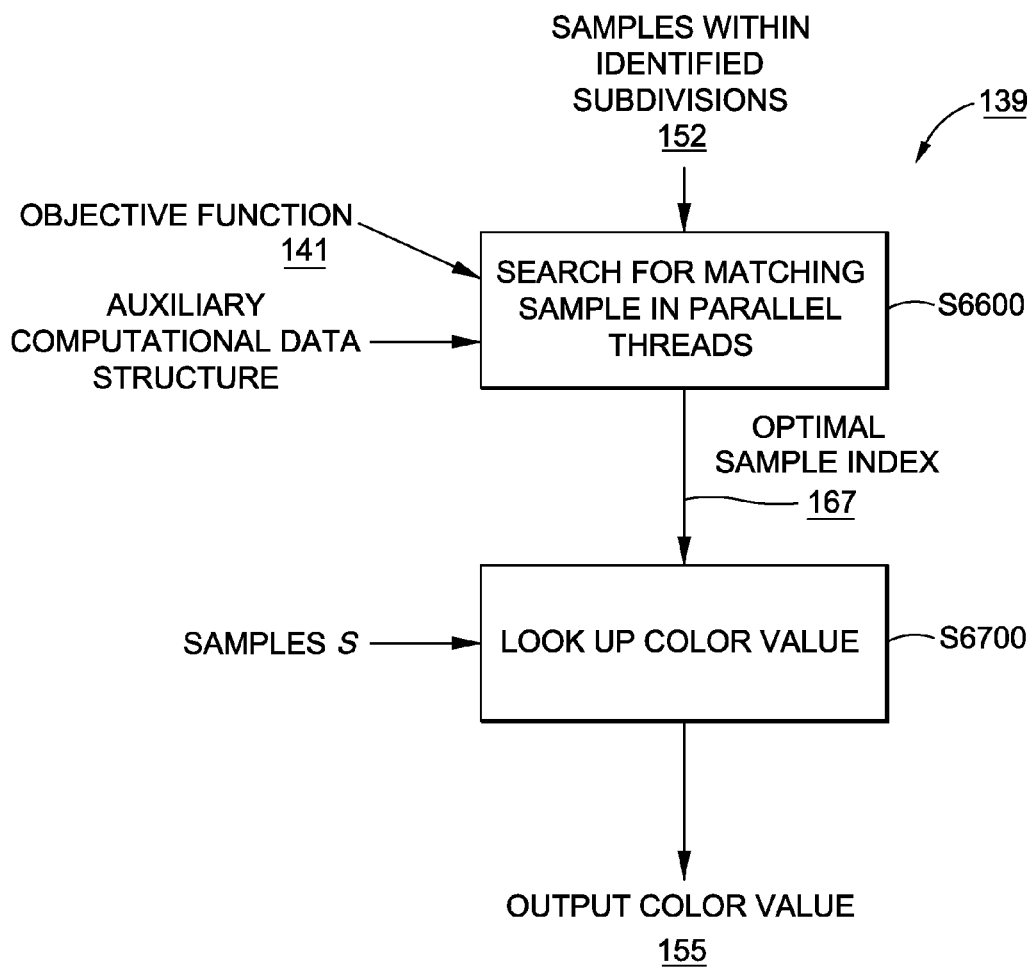
FIG. 21 is a flow diagram depicting the process steps according to a first example embodiment of the searching module in an on-line phase.

FIG. 21 depicts the process steps performed by searching module 139 according to a first example embodiment.

In step S6600, samples within identified subdivisions 152 are searched for a sample that matches acceptably to input color value 150 relative to objective function 141. The objective function result for each sample of the samples within identified subdivisions 152 is computed using the auxiliary computational data structure as described above, or alternatively, is computed directly using objective function 141. As explained before, the use of the auxiliary computational data structure allows certain quantities in objective function 141 to be pre-computed during the off-line phase and can ordinarily improve the runtime performance during the on-line phase significantly. In addition, it is noted that computation of each objective function result is independent of each other, which suggests that parallel computation can further improve the runtime performance.

Figure 22:
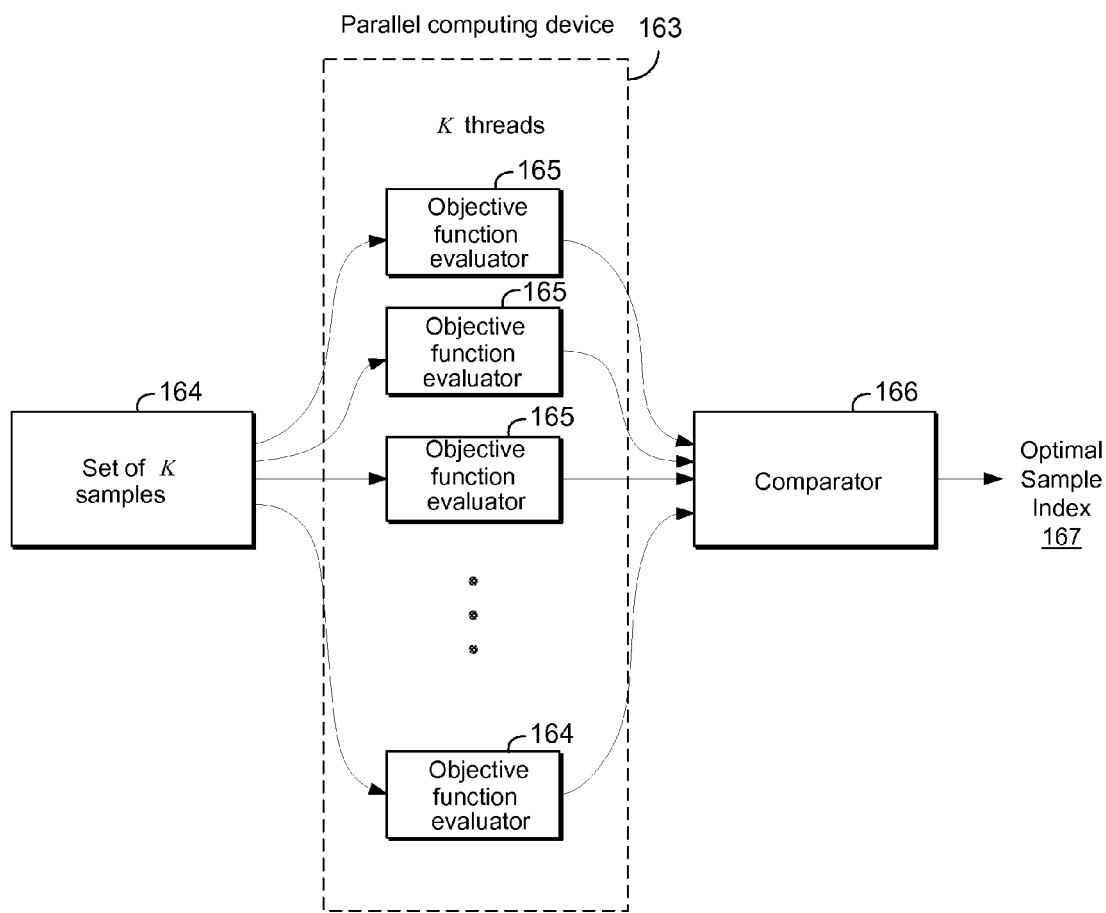
FIG. 22 illustrates an example of using a parallel compute device to search samples within identified subdivisions according to an example embodiment.

FIG. 22 illustrates an example of using parallel compute device 163 to search samples within the identified subdivisions. More specifically, it is noted that evaluation of the objective function for the samples in the identified subdivisions is independent of each other and can be done in parallel. In that regard, a set of K samples from the samples within identified subdivisions 152 can be input into parallel compute device 163 simultaneously. The number K depends on the architecture of parallel compute device 163, i.e., the number of threads parallel compute device 163 can handle without too much overhead penalty.

Each sample is processed by an objective function evaluator 165 that outputs an objective function result. Objective function evaluator 165 may comprise steps to invoke the auxiliary computational data structure. Alternatively, objective function evaluator 165 may comprise steps to invoke objective function 141 directly. The plurality of objective function results from objective function evaluators 165 are then compared by comparator 166 to determine, for example, optimal sample index 167.

Returning to FIG. 21, at step S6700, optimal sample index 167 is used to look up output color value 155. More specifically, during the off-line phase, sample set S has been generated which contains a set of samples, each with a device value, a spectral reflectance array and possibly other derivates of spectral reflectance, such as an sRGB value for simulating spectral reflectance under predetermined viewing conditions.

In one embodiment, it may make sense to archive the output image as simply an "index map". More specifically, in certain applications, there may be a requirement to be able to switch from one output format to another on the fly. For example, an sRGB simulated image is first created to be displayed on a monitor, and upon inspection, if it is satisfactory, it will be outputted to a printer, which then requires the creation of an output printer device image. An index map comprises an output image in which each pixel is populated with the corresponding optimal sample index.

Figure 23:
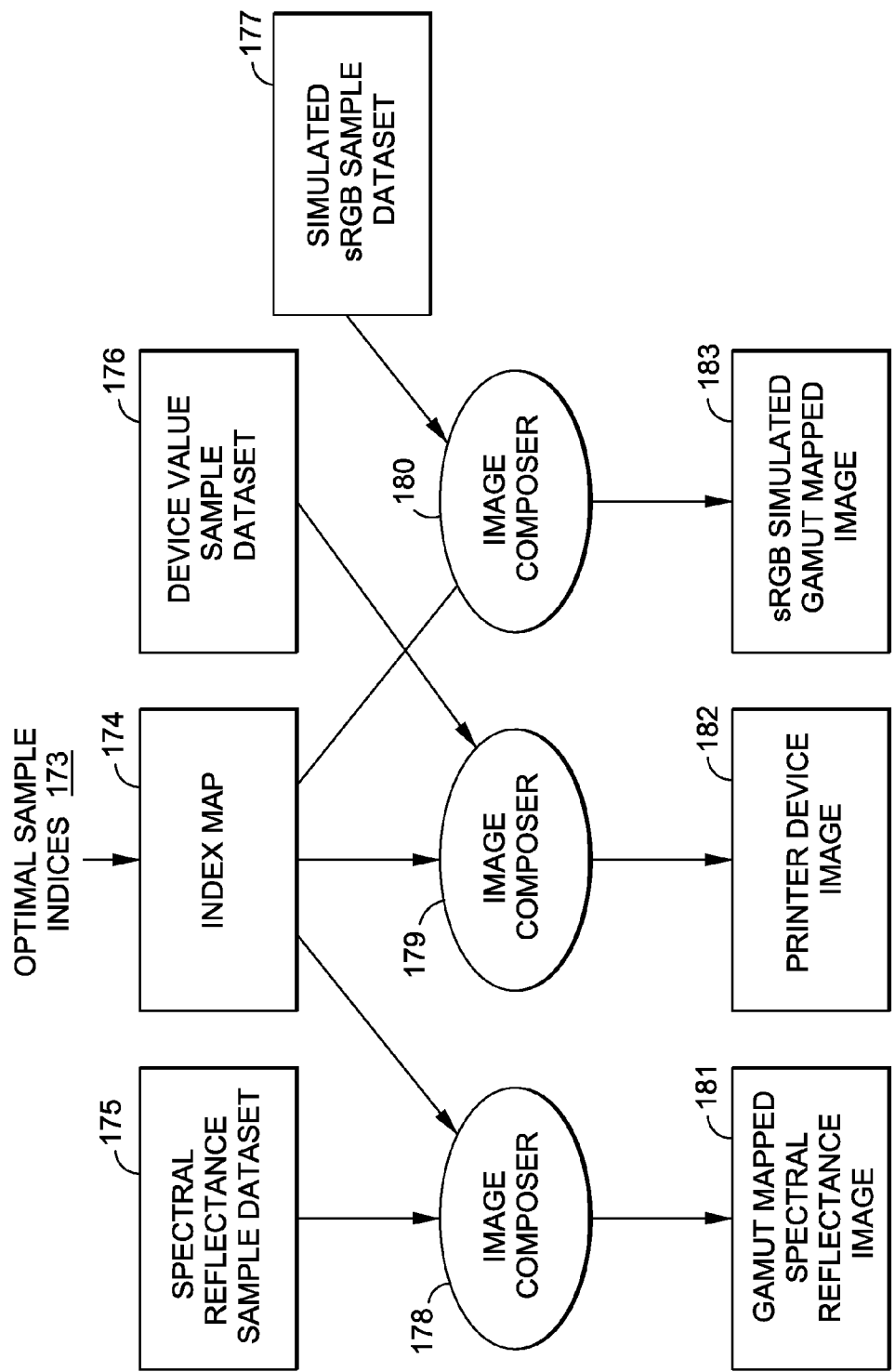
FIG. 23 is a diagram illustrating the use of an index map according to an example embodiment.

FIG. 23 illustrates the use of index map 174 according to an example embodiment. In this example embodiment, sample set S has been generated such that each sample is associated with a device value, a spectral reflectance and a simulated sRGB value, providing respectively spectral reflectance sample dataset 175, device value sample dataset 176 and simulated sRGB sample dataset 177.

Image composers 178, 179 and 180 each comprise computer-executable process steps stored in hard disk 45. Image composers 178, 179 and 180 perform simple look up steps using spectral reflectance sample dataset 175, device value sample dataset 176 and simulated sRGB sample dataset 177, respectively, to create gamut mapped spectral reflectance image 181, printer device image 182 and sRGB simulated image 183, respectively.

Second Embodiment of the Searching Module

Figure 24:
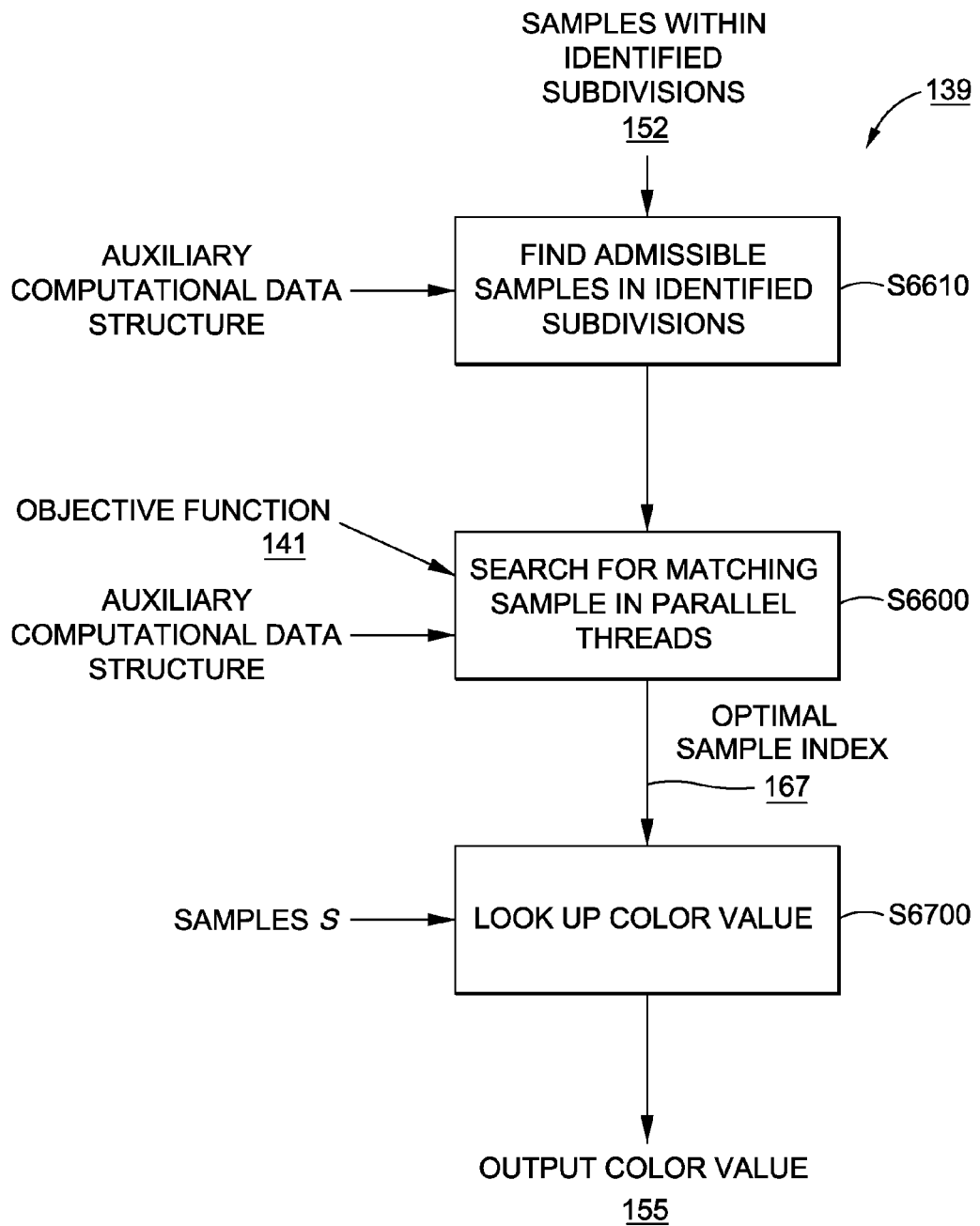
FIG. 24 is a flow diagram depicting the process steps according to a second example embodiment of the searching module in an on-line phase.

FIG. 24 depicts the process steps performed by searching module 139 according to a second example embodiment.

In step S6610, color differences are computed for each sample in the samples within identified subdivisions 152 and colorimetric value 151, and the samples yielding a color difference within a threshold are identified as admissible samples. More specifically, a color difference is evaluated between colorimetric value 151 and a given sample under the same reference illuminant used in the off-line phase. The color difference can be computed using a delta-E equation, such as Equation 9 or Equation 15 provided above.

Since delta-E equations are based on Lab values, auxiliary computational data structure, and more specifically the "LAB (D50)" column in FIG. 14, can be used to provide Lab values for each sample under the reference illuminant D50.

Alternative embodiments, particularly in the absence of an auxiliary computational data structure, may instead use the spectral reflectance arrays of each sample directly from the sample set S in order to evaluate the color differences.

Figure 25:
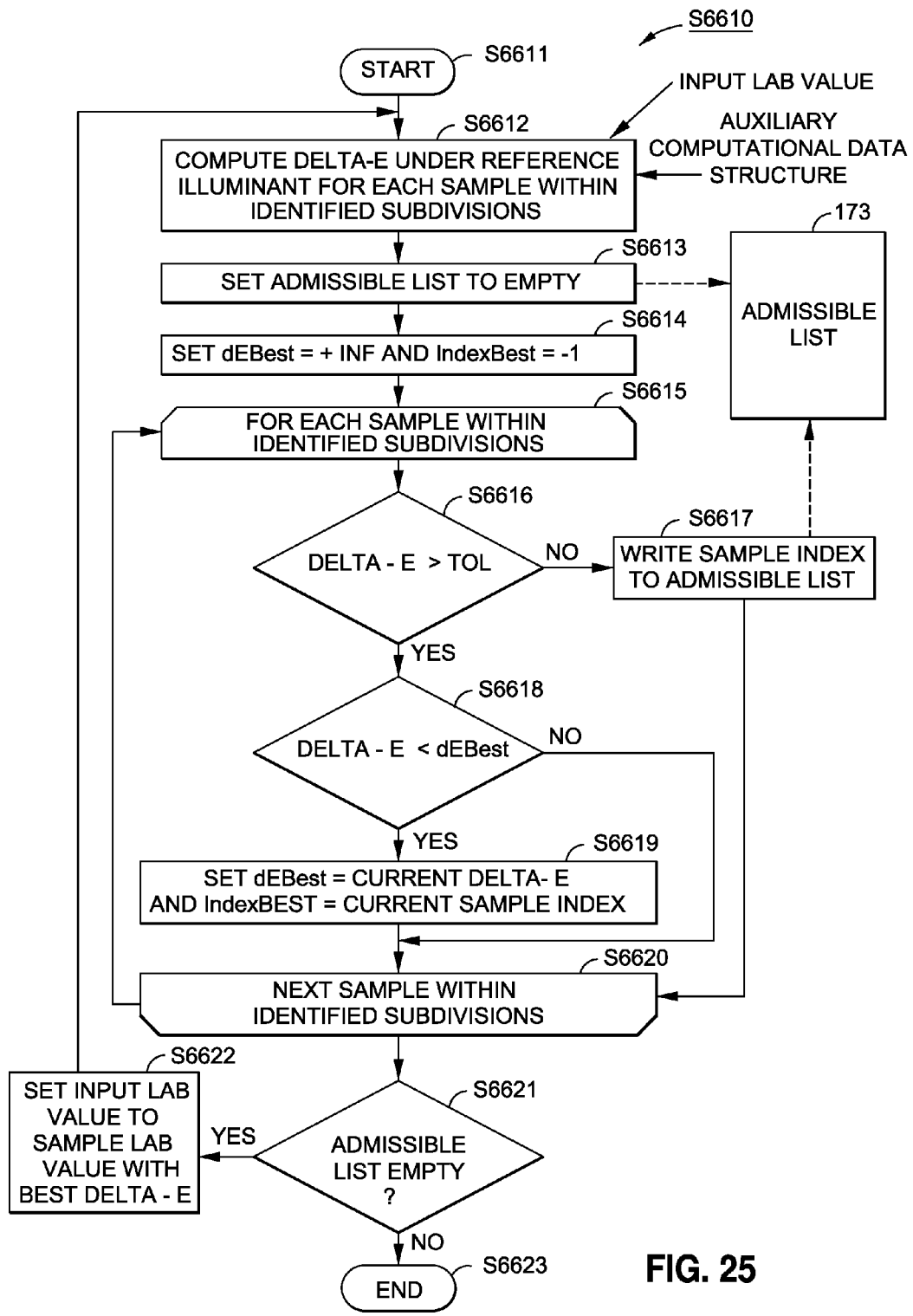
FIG. 25 is a flow diagram depicting the process steps in determining the admissible list according to an example embodiment.

FIG. 25 is a flow diagram illustrating the process steps for finding the admissible samples in step S6610 of FIG. 24.

Briefly, after starting at step S6611, color differences are computed for each sample in the identified subdivisions and the input Lab value in step S6612. A list of admissible samples is initially set to empty in step S6613. In step S6614, a value for a best color difference, dEBest, is initially set to a large value and an index for a sample with the best color difference, indexBest, is initially set to −1. Next, in the loop defined by S6615 and S6620, for each sample within the identified subdivisions, it is determined whether the sample's computed color difference is greater than a threshold, TOL, in step S6616. If the color difference is not greater than the threshold, an index of the sample is written to admissible list 173 in step S6617, and control goes to step S6620 to process the next sample within the identified subdivisions. On the other hand, if the color difference is greater than the threshold, it is determined in step S6618 whether the color difference is less than the best color difference, dEBest. If so, then dEBest is set as the current color difference and indexBest is set as the index of the current sample in step S6619. If the color difference is not less than dEBest in step S6618, then step S6619 is skipped and the process proceeds to the next sample within the identified subdivisions or proceeds to step S6621 if there are no more samples. In step S6621, it is checked whether admissible list 173 is empty, and if not, the process ends at step S6623. If admissible list 173 is determined to be empty in step S6621, the input Lab value is set as the sample Lab value with the best color difference. The process then returns to step S6612 to compute color differences for each sample within the identified subdivisions using the new input Lab value set in step S6622.

In more detail, the computation of color differences under the reference illuminant in step S6612 is accomplished in this example embodiment by accessing the auxiliary computational data structure as described above. The Lab value for each sample comes from the auxiliary computational data structure, whereas the input Lab value comes from colorimetric value 151. In alternative embodiments, the color differences can be evaluated without the auxiliary computational data structure by using the spectral reflectance arrays of each sample directly from the sample set S.

Because the color difference for each sample within the identified subdivisions can be independently computed, calculation of the color differences exhibits parallelism and can ordinarily be efficiently performed with parallel computing hardware, such as multicore CPU and many-core GPU.

In step S6613, admissible list 173 is initially set to empty in order to start the enumeration of the admissible list.

In step S6614, dEBest is set to a high value to ensure that at least one delta-E and at least one sample index will be set as dEBest and indexBest in step S6619. Step S6614 also sets indexBest to −1 to initialize indexBest, given that −1 is a value that does not correspond to any sample and therefore is an invalid index.

In the loop defined by S6615 and S6620, for each sample within the identified subdivisions, the delta-E for the current sample is checked to see whether it is greater than a threshold TOL. If the delta-E is less than or equal to TOL, then an index for the sample is written to admissible list 173 in step S6617, and control goes to step S6620 to process the next sample within the identified subdivisions.

In this example embodiment, threshold TOL is equal to 1 delta-E unit. As noted above, a delta-E of 1 represents color difference that is generally indiscernible to the human visual system. Therefore, admissible samples in this example are relatively close matches to colorimetric value 151 under the reference illuminant.

If the delta-E is greater than TOL in step S6616, then the process proceeds to step S6618 where it is determined whether the delta-E for the current sample is less than dEBest, which is the lowest delta-E checked thus far. If the delta-E for the current sample is less than dEBest, the process proceeds to step S6619. If the delta-E is not less than dEbest, step S6619 is skipped and the loop defined by S6615 and S6620 is repeated for the next sample within the identified subdivisions.

In step S6619, dEBest is set to the delta-E for the current sample and indexBest is set to the index of the current sample.

When the loop defined by S6615 and S6620 has been performed for each sample within the identified subdivisions, the process proceeds to step S6621 where it is checked whether admissible list 173 is empty. If admissible list 173 is empty, then there are no admissible samples and it is concluded that colorimetric value 151, or equivalently, the input Lab value, is outside the colorimetric gamut of the output device under the reference illuminant.

In this case, the process proceeds to step S6622 to set the input Lab value as the Lab value of the sample corresponding to indexBest.

The process then returns to step S6612 for computation of color differences for each sample in the identified subdivisions and the new input Lab value. Since the new input Lab value is in fact one of the samples within the identified subdivisions, the resulting admissible list will be nonempty, because the best sample from the last run is at zero delta-E from itself and will therefore be admissible. The rationale of this procedure is that if colorimetric value 151 is outside the colorimetric gamut under the reference illuminant, then the best sample from the last run, being the closest in-gamut sample to colorimetric value 151 under the reference illuminant, should be used as a new "center" for gathering admissible samples.

On the other hand, if it is determined in step S6621 that admissible list 173 is not empty, then the process ends at step S6623 and the indices of the admissible samples are provided to step S6600 of FIG. 24 to evaluate the objective function for the admissible samples. In evaluating the objective function for the admissible samples, the admissible samples can be considered to be all "equivalent" under the reference illuminant because the admissible samples all have delta-E's within the threshold.

Steps S6600 and S6700 of FIG. 24 are similar to the corresponding steps in the first embodiment of the searching module, with the exception that step S6600 takes as input the admissible samples in this embodiment instead of the samples within the identified subdivisions in the first embodiment.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of determining a spectral gamut of a device during an off-line phase by constructing plural subdivisions of a spanning set of samples which span the spectral gamut, the method comprising:

establishing a first crude spanning set of samples by specifying one or more corresponding device values in a device color space;

refining the first crude spanning set by processing a plurality of new samples in a predetermined order, wherein the processing includes, for each new sample, determining if the new sample does or does not differ in an objective function value by more than a predetermined threshold from all samples in the first crude spanning set, and modifying the first crude spanning set by adding the new sample to the first crude spanning set if the new sample differs in the objective function value by more than the predetermined threshold from all samples in the first crude spanning set;

designating the resulting first crude spanning set as the spanning set of samples;

obtaining a spectral reflectance array for each sample in the spanning set;

generating a colorimetric value for each sample in the spanning set by transforming the spectral reflectance array corresponding to the sample under a reference illuminant, wherein the colorimetric value includes a lightness in a lightness dimension, a chroma in a chroma dimension and a hue in a hue dimension; and subdividing the spanning set of samples into subdivisions based on the lightness, the chroma and the hue of the samples such that the number of samples in each subdivision is limited by a predetermined number, whereby in an on-line phase of spectral gamut mapping, subdivisions are identified that contain samples that are candidates for an acceptable match to an input color value which is given in the on-line phase.

2. A method according to claim 1, wherein the objective function value between a new sample and a sample in the first crude spanning set is equal to a maximum value among multiple values resulting from a color difference equation evaluated under multiple illuminants for a spectral reflectance array of the new sample and a spectral reflectance array of the sample in the first crude spanning set.

3. A method according to claim 2, wherein the spectral reflectance array of the new sample and the spectral reflectance array of the sample in the first crude spanning set are determined by processing a device value of the new sample and a device value of the sample in the first crude spanning set through a spectral forward model for the device.

4. A method according to claim 1, wherein the predetermined order for processing the plurality of new samples in the refining step is determined by an order of a sampling of the device color space.

5. A method according to claim 4, wherein the sampling of the device color space is a stratified sampling of the device color space, wherein the stratified sampling is specified by decomposing the device color space into strata with different number of nonzero channels, from lowest number of nonzero channels to highest number of nonzero channels, and determining a different sampling grid for each stratum.

6. A method according to claim 1, wherein the predetermined threshold has different values for different new samples which are located in different regions of the spectral gamut for the device.

7. A method according to claim 1, wherein the first crude spanning set consists of one sample that corresponds to a device white point.

8. A method according to claim 1, wherein establishing the first crude spanning set and establishing the plurality of new samples for processing in the refining step include the following steps:
establishing a first initial set of samples by specifying one or more corresponding device values in the device color space;
establishing a second initial set of samples by specifying corresponding device values in the device color space;
dividing the second initial set into two or more subsets;
copying the first initial set to form a first resultant set;
processing the samples in a first subset of the two or more subsets in a predetermined order, wherein the processing includes, for each sample in the first subset, determining if it does or does not differ in an objective function value by more than the predetermined threshold from all samples in the first resultant set, and modifying the first resultant set by adding the sample of the first subset to the first resultant set if the sample of the first subset differs in the objective function value by more than the predetermined threshold from all samples in the first resultant set;
processing the samples in each remaining subset in a predetermined order, wherein a remaining subset is any subset of the two or more subsets other than the first subset, wherein the processing includes, for each sample in a given remaining subset, determining if it does or does not differ in an objective function value by more than the predetermined threshold from all samples in the first initial set, and adding the sample in the given remaining subset to a resultant set for the given remaining subset if the sample in the given remaining subset differs in the objective function value by more than the predetermined threshold from all samples in the first initial set;
wherein processing the samples in the first subset and each processing the samples in any remaining subset are all performed concurrently;
merging the samples of all resultant sets for each of the remaining subsets to form a combined resultant set;
establishing the first resultant set as the first crude spanning set; and
establishing the combined resultant set as the plurality of new samples for processing in the refining step.

9. A method according to claim 1, further comprising:
generating one or more colorimetric attributes for each sample in the spanning set, wherein a colorimetric attribute includes a colorimetric value under an illuminant, a color inconstancy index from an illuminant to a reference illuminant, or a combination of multiple such colorimetric attributes.

10. A method according to claim 1, wherein the subdividing step includes subdividing the spanning set of samples into subdivisions based on a neutral spine and hue leaves in a lightness-chroma-hue (LCh) space.

11. A method according to claim 1, wherein in each subdivision there are approximately the same number of samples as in all other subdivisions.

12. A method according to claim 1, wherein in each subdivision there are at least a second predetermined number of samples.

13. A method of spectral gamut mapping a color value in a color space for a device having a spectral gamut, the method comprising:
executing an off-line phase and an on-line phase by one or more computers;
wherein the off-line phase comprises:
establishing a first crude spanning set of samples for spanning the spectral gamut by specifying one or more corresponding device values in a device color space;
refining the first crude spanning set by processing a plurality of new samples in a predetermined order, wherein the processing includes, for each new sample, determining if the new sample does or does not differ in an objective function value by more than a predetermined threshold from all samples in the first crude spanning set, and modifying the first crude spanning set by adding the new sample to the first crude spanning set if the new sample differs in the objective function value by more than the predetermined threshold from all samples in the first crude spanning set;
designating the resulting first crude spanning set as a spanning set of samples for spanning the spectral gamut;
obtaining a spectral reflectance array for each sample in the spanning set;
generating a colorimetric value for each sample in the spanning set by transforming the spectral reflectance array corresponding to the sample under a reference illuminant, wherein the colorimetric value includes a lightness in a lightness dimension, a chroma in a chroma dimension and a hue in a hue dimension; and
subdividing the spanning set of samples into subdivisions based on the lightness, the chroma and the hue of the samples such that the number of samples in each subdivision is limited by a predetermined number;
wherein the on-line phase comprises:
accepting the color value in the color space;
converting the color value into a colorimetric value under the reference illuminant, wherein the converted colorimetric value includes a lightness in the lightness dimension, a chroma in the chroma dimension and a hue in the hue dimension;
identifying subdivisions of the spanning set of samples which fall within a tolerance of the converted colorimetric value by using the lightness, the chroma and the hue of the converted colorimetric value; and
searching the samples within the identified subdivisions so as to find a sample that matches acceptably to the accepted color value relative to an on-line objective function.

14. A method according to claim 13, wherein the converting step includes a colorimetric gamut mapping of the converted colorimetric value if the converted colorimetric value is outside a colorimetric gamut of the device.

15. A method according to claim 13, wherein the searching step includes calculating on-line objective function results for the samples in the identified subdivisions in parallel.

16. A method according to claim 13, wherein the searching step includes finding a sample in the identified subdivisions yielding the lowest result for the on-line objective function.

17. A method according to claim 13, wherein the on-line objective function is equal to a maximum value among multiple values resulting from a color difference equation evaluated under multiple illuminants for the accepted color value and a spectral reflectance array of a given sample in an identified subdivision.

18. A method according to claim 13, wherein the on-line objective function is equal to a maximum value among multiple values resulting from a color inconstancy index evaluated from multiple illuminants to the reference illuminant for a spectral reflectance array of a given sample in an identified subdivision.

19. A method according to claim 13, wherein the searching step includes finding admissible samples in the identified subdivisions which yield a color difference within a threshold between the accepted color value and a spectral reflectance array of a given admissible sample under the reference illuminant, and wherein the searching step further includes finding one admissible sample out of the admissible samples which yields the lowest result for the on-line objective function.

20. A color management apparatus comprising:
a computer-readable memory constructed to store computer-executable process steps; and
a processor constructed to execute the computer-executable process steps stored in the memory;
wherein the process steps stored in the memory cause the processor to determine a spectral gamut of a device during an off-line phase by constructing plural subdivisions of a spanning set of samples which span the spectral gamut, and includes computer-executable process steps to:
establish a first crude spanning set of samples by specifying one or more corresponding device values in a device color space;
refine the first crude spanning set by processing a plurality of new samples in a predetermined order, wherein the processing includes, for each new sample, determining if the new sample does or does not differ in an objective function value by more than a predetermined threshold from all samples in the first crude spanning set, and modifying the first crude spanning set by adding the new sample to the first crude spanning set if the new sample differs in the objective function value by more than the predetermined threshold from all samples in the first crude spanning set;
designate the resulting first crude spanning set as the spanning set of samples;
obtain a spectral reflectance array for each sample in the spanning set;
generate a colorimetric value for each sample in the spanning set by transforming the spectral reflectance array corresponding to the sample under a reference illuminant, wherein the colorimetric value includes a lightness in a lightness dimension, a chroma in a chroma dimension and a hue in a hue dimension; and
subdivide the spanning set of samples into subdivisions based on the lightness, the chroma and the hue of the samples such that the number of samples in each subdivision is limited by a predetermined number,
whereby in an on-line phase of spectral gamut mapping, subdivisions are identified that contain samples that are candidates for an acceptable match to an input color value which is given in the on-line phase.

21. A non-transitory computer-readable memory medium on which are stored computer-executable process steps for causing a computer to determine a spectral gamut of a device during an off-line phase by constructing plural subdivisions of a spanning set of samples which span the spectral gamut, the process steps comprising:
establishing a first crude spanning set of samples by specifying one or more corresponding device values in a device color space;
refining the first crude spanning set by processing a plurality of new samples in a predetermined order, wherein the processing includes, for each new sample, determining if the new sample does or does not differ in an objective function value by more than a predetermined threshold from all samples in the first crude spanning set, and modifying the first crude spanning set by adding the new sample to the first crude spanning set if the new sample differs in the objective function value by more than the predetermined threshold from all samples in the first crude spanning set;
designating the resulting first crude spanning set as the spanning set of samples;
obtaining a spectral reflectance array for each sample in the spanning set;
generating a colorimetric value for each sample in the spanning set by transforming the spectral reflectance array corresponding to the sample under a reference illuminant, wherein the colorimetric value includes a lightness in a lightness dimension, a chroma in a chroma dimension and a hue in a hue dimension; and
subdividing the spanning set of samples into subdivisions based on the lightness, the chroma and the hue of the samples such that the number of samples in each subdivision is limited by a predetermined number,
whereby in an on-line phase of spectral gamut mapping, subdivisions are identified that contain samples that are candidates for an acceptable match to an input color value which is given in the on-line phase.

* * * * *